(12) United States Patent
Papakostas et al.

(10) Patent No.: US 9,307,418 B2
(45) Date of Patent: Apr. 5, 2016

(54) SYSTEMS, METHODS, AND APPARATUS TO MONITOR MOBILE INTERNET ACTIVITY

(71) Applicant: The Nielsen Company (US), LLC, New York, NY (US)

(72) Inventors: Achilleas Papakostas, Richardson, TX (US); Michael Andrew Yonker, Dallas, TX (US)

(73) Assignee: The Nielson Company (US), LLC, New York, NY (US)

( * ) Notice: Subject to any disclaimer, the term of this patent is extended or adjusted under 35 U.S.C. 154(b) by 202 days.

(21) Appl. No.: 14/041,613

(22) Filed: Sep. 30, 2013

(65) Prior Publication Data
US 2014/0036687 A1 Feb. 6, 2014

Related U.S. Application Data

(63) Continuation of application No. 13/174,517, filed on Jun. 30, 2011, now Pat. No. 8,594,617.

(51) Int. Cl.
*H04W 24/00* (2009.01)
*H04L 12/24* (2006.01)
(Continued)

(52) U.S. Cl.
CPC ............. *H04W 24/00* (2013.01); *H04L 67/303* (2013.01); *H04L 41/0806* (2013.01); *H04L 63/30* (2013.01); *H04L 67/02* (2013.01); *H04L 67/04* (2013.01); *H04L 67/2819* (2013.01); *H04L 67/34* (2013.01)

(58) Field of Classification Search
CPC . H04W 24/00; H04L 67/303; H04L 41/0806; H04L 67/02
USPC .......................................... 455/405; 370/338
See application file for complete search history.

(56) References Cited

U.S. PATENT DOCUMENTS

| 4,355,372 | A | 10/1982 | Johnson et al. |
| RE31,951 | E | 7/1985 | Johnson et al. |

(Continued)

FOREIGN PATENT DOCUMENTS

| CN | 1909739 | 2/2007 |
| CN | 10159443 | 12/2009 |

(Continued)

OTHER PUBLICATIONS

Canadian Intellectual Property Office, "Office Action", issued in connection with corresponding Canadian Patent Application No. 2,781,018, dated Apr. 7, 2014 (3 pages).

(Continued)

*Primary Examiner* — Marcos Batista
(74) *Attorney, Agent, or Firm* — Hanley, Flight & Zimmerman, LLC

(57) ABSTRACT

Systems, methods, and apparatus to monitor mobile Internet activity are disclosed. An example method comprises determining, with a processor, whether a device is communicatively coupled to a WiFi network, the WiFi network identified by a Service Set Identifier. Whether proxy settings are configured on the device in association with the WiFi network is identified. Registration information is transmitted from the device to a registrar if the proxy settings are not configured, the registration information comprising a classification of the WiFi network and the Service Set Identifier. The proxy settings of the WiFi network are configured based on instructions received from the registrar, the instructions to cause the device to transmit network communications using the proxy settings when communicatively coupled to the WiFi network.

22 Claims, 9 Drawing Sheets

(51) Int. Cl.
H04L 29/06 (2006.01)
H04L 29/08 (2006.01)

(56) References Cited

U.S. PATENT DOCUMENTS

| | | |
|---|---|---|
| 4,603,232 A | 7/1986 | Kurland et al. |
| 4,954,699 A | 9/1990 | Coffey et al. |
| 4,958,284 A | 9/1990 | Bishop et al. |
| 5,023,929 A | 6/1991 | Call |
| 5,060,140 A | 10/1991 | Brown et al. |
| 5,481,294 A | 1/1996 | Thomas et al. |
| 5,488,408 A | 1/1996 | Maduzia et al. |
| 5,497,185 A | 3/1996 | Dufresne et al. |
| 5,526,427 A | 6/1996 | Thomas et al. |
| 5,550,928 A | 8/1996 | Lu et al. |
| 5,557,686 A | 9/1996 | Brown et al. |
| 5,584,050 A | 12/1996 | Lyons |
| 5,594,934 A | 1/1997 | Lu et al. |
| 5,659,469 A | 8/1997 | Deaton et al. |
| 5,675,510 A | 10/1997 | Coffey et al. |
| 5,689,799 A | 11/1997 | Dougherty et al. |
| 5,710,887 A | 1/1998 | Chelliah et al. |
| 5,715,399 A | 2/1998 | Bezos |
| 5,732,218 A | 3/1998 | Bland et al. |
| 5,737,025 A | 4/1998 | Dougherty et al. |
| 5,737,026 A | 4/1998 | Lu et al. |
| 5,751,450 A | 5/1998 | Robinson |
| 5,771,307 A | 6/1998 | Lu et al. |
| 5,781,913 A | 7/1998 | Felsenstein et al. |
| 5,790,875 A | 8/1998 | Andersin et al. |
| 5,848,396 A | 12/1998 | Gerace |
| 5,850,249 A | 12/1998 | Massetti et al. |
| 5,862,325 A | 1/1999 | Reed et al. |
| 5,872,850 A | 2/1999 | Klein et al. |
| 5,887,140 A | 3/1999 | Itsumi et al. |
| 5,889,548 A | 3/1999 | Chan |
| 5,961,593 A | 10/1999 | Gabber et al. |
| 5,970,469 A | 10/1999 | Scroggie et al. |
| 5,991,735 A | 11/1999 | Gerace |
| 6,006,260 A | 12/1999 | Barrick, Jr. et al. |
| 6,026,367 A | 2/2000 | Hjelmvik |
| 6,026,368 A | 2/2000 | Brown et al. |
| 6,052,730 A | 4/2000 | Felciano et al. |
| 6,055,573 A | 4/2000 | Gardenswartz et al. |
| 6,058,381 A | 5/2000 | Nelson |
| 6,070,145 A | 5/2000 | Pinsley et al. |
| 6,070,148 A | 5/2000 | Mori et al. |
| 6,081,900 A | 6/2000 | Subramaniam et al. |
| 6,115,680 A | 9/2000 | Coffee et al. |
| 6,128,624 A | 10/2000 | Papierniak et al. |
| 6,138,162 A | 10/2000 | Pistriotto et al. |
| 6,138,165 A | 10/2000 | Nakatsugawa |
| 6,141,686 A | 10/2000 | Jackowski et al. |
| 6,151,593 A | 11/2000 | Cho et al. |
| 6,286,043 B1 | 9/2001 | Cuomo et al. |
| 6,286,046 B1 | 9/2001 | Bryant |
| 6,321,336 B1 | 11/2001 | Applegate et al. |
| 6,351,467 B1 | 2/2002 | Dillon |
| 6,381,632 B1 | 4/2002 | Lowell |
| 6,421,733 B1 | 7/2002 | Tso et al. |
| 6,449,251 B1 | 9/2002 | Awadallah et al. |
| 6,487,538 B1 | 11/2002 | Gupta et al. |
| 6,507,589 B1 | 1/2003 | Ramasubramani |
| 6,567,857 B1 | 5/2003 | Gupta et al. |
| 6,606,581 B1 | 8/2003 | Nickerson et al. |
| 6,658,414 B2 | 12/2003 | Bryan et al. |
| 6,704,787 B1 | 3/2004 | Umbreit |
| 6,839,680 B1 | 1/2005 | Liu et al. |
| 6,856,963 B1 | 2/2005 | Hurwitz |
| 6,993,590 B1 | 1/2006 | Gauthier et al. |
| 7,003,555 B1 | 2/2006 | Jungck |
| 7,039,599 B2 | 5/2006 | Merriman et al. |
| 7,080,077 B2 | 7/2006 | Ramamurthy et al. |
| 7,092,926 B2 | 8/2006 | Cerrato |
| 7,092,942 B2 | 8/2006 | Frieden et al. |
| 7,159,023 B2 | 1/2007 | Tufts |
| 7,181,412 B1 | 2/2007 | Fulgoni et al. |
| 7,200,632 B1 | 4/2007 | Greschler et al. |
| 7,216,149 B1 | 5/2007 | Briscoe et al. |
| 7,260,837 B2 | 8/2007 | Abraham et al. |
| 7,277,915 B2 | 10/2007 | De Boor et al. |
| 7,366,724 B2 | 4/2008 | Frieden et al. |
| 7,375,641 B2 | 5/2008 | Kiel et al. |
| 7,376,722 B1 | 5/2008 | Sim et al. |
| 7,584,423 B2 | 9/2009 | Rohrabaugh et al. |
| 7,613,809 B2 | 11/2009 | Jackson et al. |
| 7,688,813 B2 | 3/2010 | Shin et al. |
| 7,695,879 B2 | 4/2010 | Vanbesien et al. |
| 7,814,483 B2 | 10/2010 | Li et al. |
| 7,849,502 B1 | 12/2010 | Bloch et al. |
| 8,086,219 B2 | 12/2011 | O'Neil et al. |
| 8,285,218 B2 | 10/2012 | Papakostas et al. |
| 8,307,006 B2 | 11/2012 | Hannan et al. |
| 8,340,711 B1 * | 12/2012 | Glass et al. ............... 455/552.1 |
| 2001/0014915 A1 | 8/2001 | Blumenau |
| 2001/0020242 A1 | 9/2001 | Gupta et al. |
| 2002/0069368 A1 | 6/2002 | Hines |
| 2002/0077903 A1 | 6/2002 | Feldman et al. |
| 2002/0116523 A1 | 8/2002 | Warrier et al. |
| 2002/0128803 A1 | 9/2002 | Skinner et al. |
| 2002/0144156 A1 | 10/2002 | Copeland, III |
| 2002/0169830 A1 | 11/2002 | Mild et al. |
| 2002/0178257 A1 | 11/2002 | Cerrato |
| 2003/0009762 A1 | 1/2003 | Hooper et al. |
| 2003/0018778 A1 | 1/2003 | Martin et al. |
| 2003/0033432 A1 | 2/2003 | Simpson et al. |
| 2003/0035409 A1 | 2/2003 | Wang et al. |
| 2003/0051052 A1 | 3/2003 | Shteyn et al. |
| 2003/0065595 A1 | 4/2003 | Anglum |
| 2003/0076305 A1 | 4/2003 | Allen |
| 2003/0091025 A1 | 5/2003 | Celi, Jr. et al. |
| 2003/0154306 A1 | 8/2003 | Perry |
| 2003/0195884 A1 | 10/2003 | Boyd et al. |
| 2004/0133687 A1 | 7/2004 | Yamaguchi et al. |
| 2004/0205159 A1 | 10/2004 | Johnson et al. |
| 2005/0021603 A1 | 1/2005 | Yokomitsu et al. |
| 2005/0108539 A1 | 5/2005 | Skog et al. |
| 2005/0138192 A1 | 6/2005 | Encarnacion et al. |
| 2005/0198261 A1 | 9/2005 | Durvasula et al. |
| 2005/0201357 A1 | 9/2005 | Poyhonen |
| 2006/0258341 A1 | 11/2006 | Miller et al. |
| 2006/0264202 A1 | 11/2006 | Hagmeier et al. |
| 2007/0123760 A1 | 5/2007 | Scholler et al. |
| 2007/0214501 A1 | 9/2007 | Muramoto et al. |
| 2007/0222598 A1 | 9/2007 | Kiel et al. |
| 2007/0274211 A1 * | 11/2007 | Tsubota ........................ 370/229 |
| 2008/0005736 A1 | 1/2008 | Apacible et al. |
| 2008/0056261 A1 | 3/2008 | Osborn et al. |
| 2008/0289010 A1 | 11/2008 | Frieden et al. |
| 2009/0034536 A1 | 2/2009 | Morand et al. |
| 2009/0233633 A1 | 9/2009 | Morrison |
| 2009/0282471 A1 | 11/2009 | Green et al. |
| 2009/0285118 A1 * | 11/2009 | Yoshikawa et al. ........... 370/254 |
| 2009/0296917 A1 | 12/2009 | Nogawa |
| 2009/0320123 A1 | 12/2009 | Yu et al. |
| 2010/0095215 A1 | 4/2010 | Elven |
| 2010/0191947 A1 | 7/2010 | Shin |
| 2010/0205617 A1 | 8/2010 | Hogan et al. |
| 2010/0216434 A1 | 8/2010 | Marcellino et al. |
| 2010/0293610 A1 | 11/2010 | Beachem et al. |
| 2011/0047254 A1 * | 2/2011 | Vainionpaa et al. ........... 709/222 |
| 2012/0042005 A1 | 2/2012 | Papakostas et al. |
| 2012/0042367 A1 | 2/2012 | Papakostas et al. |
| 2012/0210321 A1 | 8/2012 | Silva et al. |
| 2012/0216063 A1 | 8/2012 | Ogata |
| 2012/0235930 A1 | 9/2012 | Lazaridis et al. |
| 2012/0295581 A1 | 11/2012 | Agarwal |
| 2013/0006708 A1 | 1/2013 | Lee |
| 2013/0031599 A1 | 1/2013 | Luna et al. |
| 2013/0035059 A1 | 2/2013 | Liu et al. |
| 2013/0064109 A1 | 3/2013 | Combet et al. |
| 2013/0066875 A1 | 3/2013 | Combet et al. |
| 2013/0183926 A1 | 7/2013 | Lindberg et al. |

(56) References Cited

U.S. PATENT DOCUMENTS

| | | |
|---|---|---|
| 2013/0281050 A1 | 10/2013 | Agarwal et al. |
| 2014/0273923 A1 | 9/2014 | Papakostas |
| 2014/0280896 A1 | 9/2014 | Papakostas et al. |

FOREIGN PATENT DOCUMENTS

| | | |
|---|---|---|
| CN | 101605030 | 12/2009 |
| CN | 102377616 | 3/2012 |
| EP | 2079256 | 7/2007 |
| EP | 1980950 | 10/2008 |
| EP | 2341437 | 7/2011 |
| JP | 2003219467 | 7/2003 |
| JP | 2004342080 | 12/2004 |
| JP | 2005115473 | 4/2005 |
| JP | 2007200209 | 8/2007 |
| JP | 2008511229 | 4/2008 |
| JP | 2009514050 | 4/2009 |
| JP | 2010079831 | 4/2010 |
| KR | 2005008068 | 10/2005 |
| WO | 96/41495 | 12/1996 |
| WO | 98/31155 | 7/1998 |
| WO | 00/55783 | 9/2000 |
| WO | 01/11506 | 2/2001 |
| WO | 01/44975 | 6/2001 |
| WO | 01/52462 | 7/2001 |
| WO | 02/50694 | 6/2002 |
| WO | 03/067376 | 8/2003 |
| WO | 2006044820 | 4/2006 |
| WO | 2007123760 | 11/2007 |

OTHER PUBLICATIONS

IP Australia, "Notice of Acceptance", issued in connection with Australian Patent Application No. 2012203829, dated Jun. 12, 2014 (2 pages).
United States Patent and Trademark Office, "Notice of Allowance", issued in connection with U.S. Appl. No. 12/856,643, dated Aug. 5, 2014 (5 pages).
United States Patent and Trademark Office, "Notice of Allowance", issued in connection with U.S. Appl. No. 12/856,651 dated Jul. 7, 2014 (13 pages).
The State Intellectual Property Office of China, "First Office Action", issued in connection with Chinese Patent Application No. 201210296506.2, dated Sep. 2, 2014 (21 pages).
United States Patent and Trademark Office, "Notice of Allowance", issued in connection with U.S. Appl. No. 13/174,517, Sep. 26, 2013, (2 pages).
United States Patent and Trademark Office, "Notice of Allowance", issued in connection with U.S. Appl. No. 13/174,517, Oct. 25, 2013, (6 pages).
United States Patent and Trademark Office, "Notice of Allowance", issued in connection with U.S. Appl. No. 13/174,517, Aug. 22, 2013, (19 pages).
United States Patent and Trademark Office, "Notice of Allowance", issued in connection with U.S. Appl. No. 12/856,643, Apr. 10, 2014, (14 pages).
Chinese Patent Office, "Office Action" in application No. 201110294045.0, dated Apr. 3, 2014 (5 pages, English translation included).
Canadian Patent Office, "Office Action" issued in connection with Canadian Patent Application No. 2,749,013, dated Sep. 10, 2013 (2 pages).
Canadian Patent Office, "Office Action" issued in connection with Canadian Patent Application No. 2,748,997, dated Nov. 21, 2013 (2 pages).
United States Patent and Trademark Office, "Advisory Action", issued in connection with U.S. Appl. No. 12/856,651, Nov. 22, 2013, (2 pages).
United States Patent and Trademark Office, "Office Action", issued in connection with U.S. Appl. No. 13/174,517, Aug. 15, 2012, (13 pages).
Japanese Patent Office, "Notice of Reasons for Rejection", issued in connection with Japanese Patent Application No. P2011-177687, dated Jun. 4, 2013 (7 pages).
State Intellectual Property Office of China, "Notice of Allowance", issued in connection with Chinese Patent Application No. 201110294045.0, dated Jul. 4, 2014 (5 pages, English translation included).
IP Australia, "Notice of Acceptance", issued in connection with Australian Patent Application No. 2011211444, dated Apr. 29, 2014 (2 pages).
Canadian Intellectual Property Office, "Notice of Allowance", issued in connection with Canadian Patent Application No. 2,749,013, dated Nov. 4, 2014 (1 page).
Chinese Patent Office, "Office Action" issued in corresponding application No. 201110294045.0, dated Sep. 26, 2013 (26 pages, English translation included).
Chinese Patent Office, "Office Action" issued in corresponding application No. 201110305485.1, dated Sep. 22, 2013 (22 pages, English translation included).
United States Patent and Trademark Office, "Final Office Action", issued in connection with U.S. Appl. No. 12/856,651 on Aug. 28, 2013 (16 pages).
Dossick, S.E. et al., "WWW access to legacy client/server applications," Fifth International World Wide Web Conference, May 6-10, 1996, Paris, FR, http://iw3c2.cs.ust.hk/WWW5/www5conf.inria.fr/fich_html/papers/P4/Overview.html, (12 pages).
Zenel, B., et al., "A general Purpose Proxy Filtering Mechanism Applied to the Mobile Environment," Wireless Networks, ACM, US, vol. 5, No. 5, Oct. 1999, XP000902494, (9 pages).
Diffie W. et al., "Privacy and Authentication: An introduction to Cryptography" Proceedings of the IEEE, IEEE. New York, US, vol. 67, No. 3, Mar. 1979, pp. 397-426, SP000575227, (32 pages).
Srivastava, J., et al. "Web Usage Mining: Discovery and Applications of Usage Patterns from Web Data" ACM SIGKDD Explorations Newsletter, vol. 1, Issue 2, pp. 12-23, Jan. 2000, (12 pages).
Boyan, J. "The Anonymizer—Protecting User Privacy on the Web," Computer-Mediated Communication Magazine, 'Online! 1997, XP002231197, http://www.december.com/cmc/mag/1997/sep/toc.html, retrieved in 1997, (6 pages).
Choo, C. et al. "A Behavioral Model of Information Seeking on the Web—Preliminary Results of a Study of How Managers and IT Specialists Use the Web," Oct. 25, 1998, (16 pages).
European Patent Office, "European Search Report", Issued in connection with Application No. 11006705.5-2413, Oct. 14, 2011, (7 pages).
European Patent Office, "Partial European Search Report", Issued in connection with Application No. 11006706.3-2413, Oct. 25, 2011, (7 pages).
Wavecrest Computing, "Cyfin Proxy User Manual for Version 8.2.x", XP55009573, URL:http://downloads.wavecrest.net/release/cyfin/manuals/v820/cyfinProxyManual.pdf, Apr. 9, 2010, (147 pages).
"User Identification and Authentication Vital Security 9.2", XP55009307, http://www.m86security.com/software/secure_web_gateway/manuals.9.2.0/User_Identification_and Authentication.pdf, Apr. 25, 2010, (27 pages).
"HTTP Proxy Authentication and iPhone Apps", XP55009373, https://discussions.apple.com/message/8018666#8018666, Jan. 15, 2009, (4 pages).
United States Patent and Trademark Office, "Office Action", issued in connection with U.S. Appl. No. 12/856,651, Mar. 27, 2012, (12 pages).
European Patent Office, "Extended European Search Report and European Search Opinion", issued in connection with European Patent Application No. 11006706.3-2413, Apr. 5, 2012, (15 pages).
Japanese Patent Office, "Notice of Reasons for Rejection", issued in Patent application No. P2011-177687, Dated Aug. 21, 2012 (3 pages, English translation included).
United States Patent and Trademark Office, "Office Action", issued in connection with U.S. Appl. No. 12/856,643, Jun. 18, 2012, (9 pages).
Japanese Patent Office, "Notice of Reasons for Rejection", issued in Patent application No. P2011-177690, Dated Aug. 21, 2012 (4 pages, English translation included).

(56) References Cited

OTHER PUBLICATIONS

European Patent Office, "Partial European Search Report and European Search Opinion", issued in connection with European Patent Application No. 12004911.9-2413, Dec. 13, 2012, (8 pages).
European Patent Office, "Extended European Search Report", issued in connection with EP patent application No. 12004911.9-1856/2549713, mailed Apr. 3, 2013 (11 pages).
IP Australia, "Patent Examination Report No. 1", issued in connection with AU patent application 2011211443, issued Apr. 2, 2013, (3 pages).
IP Australia, "Patent Examination Report No. 1", issued in connection with AU patent application 2011211444, issued Apr. 2, 2013, (3 pages).
Japan Patent Office, "Notice of Reasons for Rejection", issued in connection with JP patent application No. P2012-145685, mailed May 7, 2013 (4 pages, English translation included).
IP Australia, "Patent Examination Report No. 1", issued in connection with AU patent application No. 2012203829, mailed May 21, 2013 (3 pages).
Japanese Patent Office, "Notice of Reasons for Rejection", issued in Patent application No. P2011-177690, Dated May 29, 2013 (4 pages, English translation included).
United States Patent and Trademark Office, "Final Office Action", issued in connection with U.S. Appl. No. 12/856,643, May 9, 2013, (10 pages).
Japanese Patent Office, "Notice of Reasons for Rejection", issued in Patent application No. P2011-177690, dated Aug. 21, 2012 (4 pages).
United States Patent and Trademark Office, "Office Action", issued in connection with U.S. Appl. No. 13/840,543, May 21, 2015, (27 pages).
United States Patent and Trademark Office, "Office Action", issued in connection with U.S. Appl. No. 13/840,594, Sep. 19, 2014, (21 pages).
United States Patent and Trademark Office, "Office Action", issued in connection with U.S. Appl. No. 13/840,594, Mar. 11, 2015, (28 pages).
United States Patent and Trademark Office, "Notice of Allowance", issued in connection with U.S. Appl. No. 13/840,594, May 26, 2015, (12 pages).
IP Australia, "Patent Examination Report No. 1," issued in connection with Application No. 2014210640, May 27, 2015, 4 pages.
Canadian Intellectual Property Office, "Notice of Allowance", issued in connection with Canadian Patent Application No. 2,748,997, Mar. 16, 2015, 1 page.
Patent Cooperation Treaty, "International Search Report and Written Opinion," issued in connection with Application No. PCT/US2014/028176, Sep. 1, 2014, 11 pages.
Canadian Intellectual Property Office, "Notice of Allowance", issued in connection with Canadian Patent Application No. 2,781,018, Apr. 16, 2015, 1 page.
State Intellectual Property Office of China, "Notice of Allowance," issued in connection with Application No. 201210296506.2, Mar. 18, 2015, 5 pages.

\* cited by examiner

SYSTEMS, METHODS, AND APPARATUS TO MONITOR MOBILE INTERNET ACTIVITY

RELATED APPLICATION

This patent arises from a continuation of U.S. patent application Ser. No. 13/174,517, entitled "SYSTEMS, METHODS, AND APPARATUS TO MONITOR MOBILE INTERNET ACTIVITY," which was filed on Jun. 30, 2011, and which is hereby incorporated herein by reference in its entirety.

FIELD OF THE DISCLOSURE

This disclosure relates generally to monitoring Internet activity, and, more particularly, to systems, methods, and apparatus to monitor mobile Internet activity.

BACKGROUND

In recent years, methods of accessing Internet content have evolved. For example, Internet content was formerly primarily accessed via computer systems such as desktop and laptop computers. Recently, handheld mobile devices (e.g., smartphones) have been introduced that allow users to request and view Internet content. Typically, mobile devices request and receive Internet content via a wireless access network such as, but not limited to, an 802.11g WiFi network.

DETAILED DESCRIPTION

Figure 1:
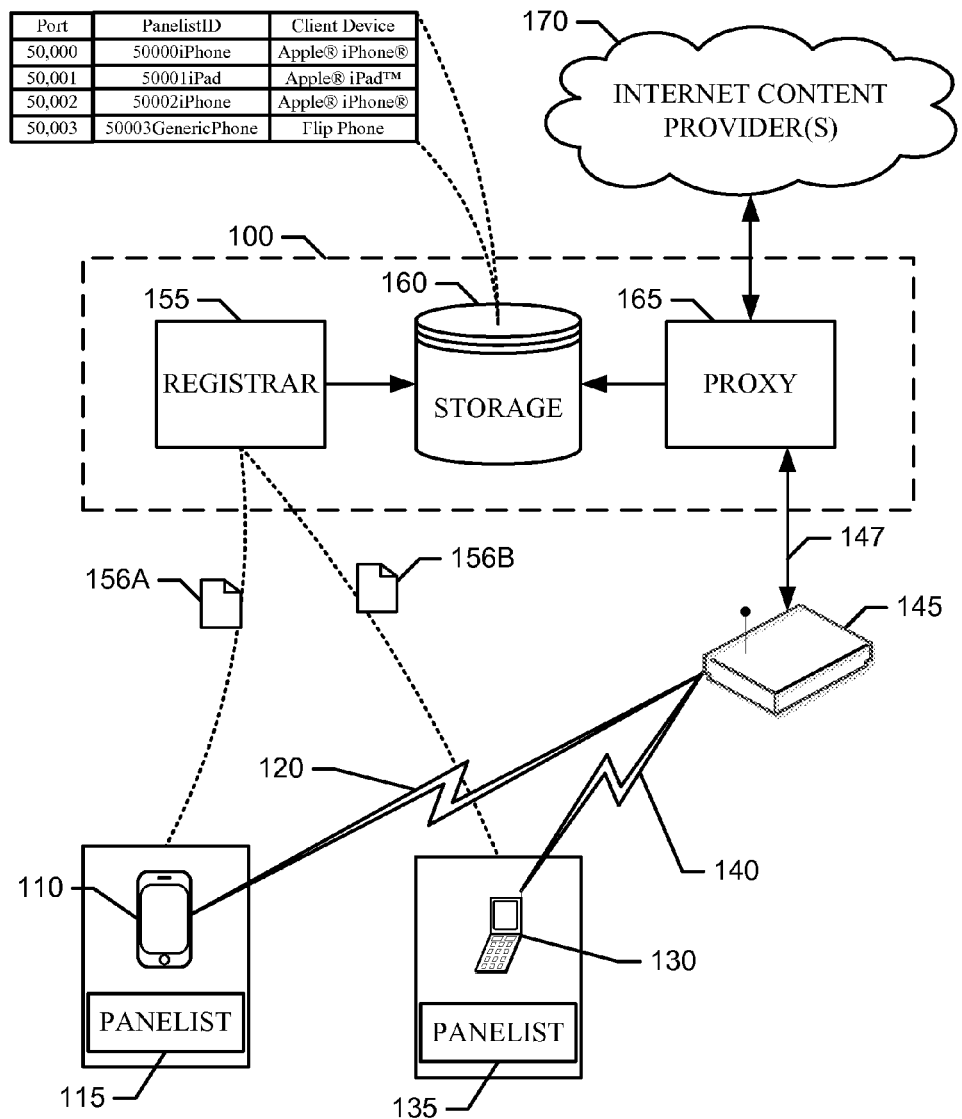
FIG. 1 is a block diagram of an example system to monitor mobile Internet activity.

Mobile monitoring companies desire to gain knowledge on how users interact with their handheld mobile devices such as smartphones. For example, mobile monitoring companies want to monitor Internet traffic to and/or from the handheld mobile devices to, among other things, monitor exposure to advertisements, determine advertisement effectiveness, determine user behavior, identify purchasing behavior associated with various demographics, etc. Some known systems have utilized a proxy server to monitor Internet content being transmitted to and from the monitored device.

Such known monitoring systems implemented the proxy server as a Hypertext Transfer Protocol (HTTP) proxy that communicated with monitored handheld devices via a single port and required the monitored devices to provide authentication credentials including a username/device name and password that uniquely identified the mobile device involved in this Internet communication. These monitoring systems allowed mobile monitoring companies to associate Internet activity with the mobile device it originated from based on the username and password. Internet activity on handheld mobile devices is not limited to use of browsers (e.g., Apple® Safari®). For example, the Apple® iPhone® and Apple® iPad™ support many third party applications (sometimes referred to as "Apps") accessing Internet content to perform a special function. For example, a weather application may request and display HTTP data from www.weather.com. These apps typically do not permit unrestricted browsing from website to website on the Internet (although they may permit movement within a defined set of webpages). Thus, apps typically provide access to a limited set of data on the Internet. In contrast, a browser enables a user to access virtually any publicly available site on the Internet (subject to restrictions such as content blockers) and shows the user the contents of a website such as www.weather.com.

While some applications accessing Internet content properly respond to proxy requests to provide credentials, many applications, such as the weather application from the previous example, do not presently support proxy authentication and therefore may fail to function (e.g., freeze or crash) if a proxy requests credentials. Further, some applications supporting proxy authentication do not function under certain circumstances such as, for example, when very long Universal Resource Locators (URLs) are used to request content via the proxy. In the case of a browser accessing a web page identified by a URL, the panelist might be requested to enter credentials for each object (e.g., images, video feeds, etc.). Additionally or alternatively, the credentials might be stored and/or cached such that the panelist is not prompted to enter credentials. When the proxy requests credentials, even if the credentials are stored and/or cached, communication delays are induced allow for the credential requests and credentials responses to be transmitted. This can be frustrating for panelists and may cause the panelist to abandon participation in the monitoring panel. Furthermore, it is desirable for monitoring entities to monitor Internet activity without affecting the manner in which users behave. Causing application failure due to a monitoring technique is inconsistent with that desire.

To avoid errors inherent in using an authenticated proxy, the example system shown in FIG. 1 employs an un-authenticated proxy. Use of a proxy that does not request authentication credentials (i.e., an un-authenticated proxy), is problematic in that such an approach does not lend itself to user identification, and user identification is necessary to correlate activity behavior with demographics. The example system of FIG. 1 addresses this problem by hosting a unique un-authenticated port for each panelist and/or mobile device and instructing each monitored mobile device to communicate using its uniquely assigned port. This use of multiple ports allows the monitoring entity to uniquely associate the Internet traffic it detects with the panelist and/or mobile device involved in such traffic. While previous monitoring systems hosted a proxy connection on a single port such as port 8080, the proposed monitoring system hosts connections on many available ports (e.g., ports 0 to 65535). Certain ports are omitted from the list of available ports if those ports are associated with other Internet services. For example, ports 0 through 1023 are defined as Well Known Ports by the Internet Assigned Numbers Authority (IRNA), and are prohibited from use without registration. Thus, Well Known Ports are not used in the example system of FIG. 1.

Some example methods of monitoring involve using an un-authenticated proxy on a port uniquely assigned to the panelist and/or handheld mobile device. However, when the handheld mobile device communicates via a WiFi network, a firewall likely exists between the handheld mobile device and the proxy. For example, many businesses and/or companies use firewalls to prohibit malicious and/or unwanted Internet content from reaching the users of their network. Firewalls block and/or prohibit malicious and/or unwanted Internet content by blocking particular ports. Ports 0 through 1023 are defined as Well Known Ports by the Internet Assigned Numbers Authority (IRNA), and are prohibited from use without registration with IRNA, and therefore, communications over the Well Known Ports are more likely to be legitimate communications, and are conversely less likely to be blocked. Internet communications outside of the Well Known Ports range may be determined to be malicious and/or unwanted, and, thus, may be blocked by a firewall. Thus, for example, the firewall may block all Internet communications from port 1024 to port 65535, and if the uniquely assigned port is within the blocked range (e.g., port 1024 to port 65535), the Internet communications of the handheld mobile device may be blocked. Because firewalls may be configured to block communication on unregistered ports, some panelists (e.g., panelists communicating via a blocked port) may experience application failures when using a WiFi network. This can be frustrating for panelists and may cause the panelist to abandon participation in the monitoring panel. Again, it is desirable for monitoring entities to monitor Internet activity without affecting the manner in which users behave. Causing application failure due to a monitoring technique is inconsistent with that desire.

To avoid errors inherent in using proxy ports being blocked, proxy auto configuration (PAC) files are used to transfer proxy configuration details (e.g, a desired proxy address, a desired proxy port number, etc.) to the panelist and/or mobile device. When configuring their device, the panelist is instructed to input a URL identifying a PAC file uniquely generated for that panelist. When accessing internet content, the PAC file is retrieved and the settings described in the file are applied to the mobile device. In some examples, the PAC file includes instructions detailing failover methods that might be used by the mobile device in the event that a firewall is blocking the desired port number and/or desired proxy address. Further, in some examples the PAC file is hosted by the monitoring entity, and can thereby be modified to facilitate changes as required by the monitoring entity such as, for example, load balancing, failure protection, etc.

After proxying the request and response to and/or from the mobile device, the monitoring system may then record the data that the client devices request and/or receive and/or some or all of the data itself Identifications of data and/or the data itself (e.g., web content) are collectively referred to herein as "session data." The session data is recorded in association with the panelist via the proxy address and/or proxy port number on which the session data is transmitted. From the recorded session data and recorded proxy port number, the monitoring system can uniquely identify the site(s) that a particular panelist is visiting and how the panelist interacted with their mobile device, while avoiding interruption of services for the panelist. Because the panelist is known from, for example, a registration process, the session data can be associated with demographics and/or be used to extrapolate behavior data to a demographic population of interest. In some examples, the monitoring system further determines a location of the panelist by assigning multiple proxies to the panelist, and associating each of the assigned proxies to a location frequented by the panelist (e.g., a location frequented by the panelist might be uniquely associated with a particular WiFi network).

In some mobile devices, such as the Apple® iPhone® and Apple® iPad™, WiFi proxy settings are configured on an access point level. For example, proxy settings entered for a first wireless access point are not applicable to a second wireless access point. In day-to-day use of the mobile device, a panelist is likely to use more than one wireless access point. For example, the panelist might use a first wireless access point while at home and a second wireless access point while at work. In some examples, multiple proxy addresses are assigned to a single panelist so that communications from the mobile device of the panelist while attached to a first wireless access point can be distinguished from communications while attached to a second wireless access point. In some examples, the panelist is provided a first proxy addresses for home use, a second proxy address for work use, and a third proxy address for other use. Although these specific locations are mentioned, any other location(s) (e.g., proxy address(es)) and/or number of location(s) may additionally or alternatively be used.

To configure the wireless access point settings for use with a proxy, the user may be instructed to manually enter supplied configuration details. In such an example, the panelist may be provided with a set number of proxy configurations (e.g., one for 'home', one for 'work', one for 'other', etc.) The panelist then enters the supplied configuration details in order to enable monitoring of communications of the mobile device when communicating via that wireless access point. Therefore, in such examples, to monitor communications of the mobile device, the panelist is relied upon to enter the supplied configuration details correctly to all wireless access points that are regularly used.

In some examples, a setup application executed on the mobile device applies the supplied configuration details to the monitored device to adjust the wireless access point settings. In some such examples, the setup application monitors wireless access points to determine which access points are regularly used and then applies an appropriate proxy configuration for the wireless access point. In some such examples, determining an appropriate proxy configuration involves prompting the user to categorize the wireless access point as a 'home' access point, a 'work' access point, an 'other' access point, and/or any other type of access point (e.g., coffee shop, book store, restaurant, etc.). Based on the categorization, the correct supplied configuration details can be applied to the wireless access point settings by the setup application. Although the above example describes the setup application as being executed on the monitored device, additionally or alternatively, the setup application might be executed on any other computing device such as, for example, a personal computer of the panelist. In some such examples, proxy configurations are inspected and the panelist is prompted while the mobile device is being synchronized and/or docked with the personal computer.

FIG. 1 is a block diagram of an example system 100 to monitor mobile Internet activity. The example system monitors Internet traffic to and/or from handheld mobile devices (e.g., a first client device 110 associated with a first panelist 115, a second client device 130 associated with a second panelist 135, etc.). The monitored Internet traffic between any of the monitored devices (e.g., the client device 110, the client device 130, etc.) and one or more Internet sites (illustrating Internet content provider(s) 170) is routed to the example monitoring system 100. As shown in FIG. 1, the traffic passes through a wireless (e.g., WiFi) communication system (e.g., an access point 145 and communicative links 120, and/or 140). The example monitoring system 100 includes a registrar 155, a storage database 160, and a proxy 165.

The example first and second client devices 110, 130 of FIG. 1 are handheld mobile devices such as cellular phones. However, any other type of wireless capable device may additionally or alternatively be used. Thus, while in the illustrated example the first client device 110 is shown as an Apple® iPhone® and the second client device 130 is shown as a flip phone, any other type of device may be used. For example, other types or phones, a laptop computer, a desktop computer, a personal digital assistant (PDA), a netbook, or a tablet computer (e.g., an Apple® iPad™) may additionally or alternatively be used. The first and second client devices 110, 130 may have any mobile operating system, and may implement any type of hardware and/or form factor. In the illustrated example, the first and second client devices 110, 130 are mobile devices which communicate with the access point 145 via the first and second wireless communication links 120, 140, respectively.

The first and second communication links 120, 140 of the illustrated example are WiFi communication links. However, any other method(s) and/or system(s) of communication may additionally or alternatively be used such as, for example, an Ethernet connection, a Bluetooth connection, a cellular connection, etc. Further, the example first and second communication links 120, 140 of FIG. 1 are WiFi connections implemented in accordance with an Institute of Electrical and Electronics Engineers (IEEE) 802.11g standard. However, any other past, present, and/or future system(s) and/or protocol(s) for communications may be used such as, for example, IEEE 802.11n, IEEE 802.11b, etc.

The first and second panelists 115, 135 of the illustrated example are panelists participating in a monitoring service. Although the example system of FIG. 1 is a panelist-based system, non-panelist and/or hybrid panelist (e.g., some panelists and some non-panelists monitored in the same system) systems may alternatively be employed. In the panelist system of the illustrated example, demographic information is obtained from the user when the user joins (i.e., registers for) the panel. The demographic information may be obtained from the user in any desired way (e.g., via a telephone interview, by having the user complete an online survey, etc.). Additionally or alternatively, panelists may be contacted and/or enlisted using any desired methodology (e.g., random selection, statistical selection, phone solicitations, Internet advertisements, surveys, advertisements in shopping malls, etc.).

In the illustrated example, the first and second panelists 115, 135 are associated with the first and second client devices 110, 130, respectively. In the illustrated example, the client devices 110, 130 are owned, leased, or otherwise belong to their respective panelists. The monitoring entity of the illustrated example does not provide the client devices. In other systems, the monitoring entity provides some or all of the panelist(s) with a respective client device to encourage the panelist(s) to participate in the panel. While in the illustrated example, the first and second client devices 110, 130 are each associated with a single panelist, each of the first and second client devices 110, 130 may alternatively be associated with more than one panelist. For example, a family and/or household of users may have a single client device that may be shared amongst multiple users. The sharing of a client device is less common when the client device is a cellular phone than when the client device is a portable computer (e.g., an Apple® iPad™)

The access point 145 of the illustrated example provides wireless Internet service to the first and second client devices 110, 130 via, for example, the communication links 120, 140. In the illustrated example, the wireless service is provided via WiFi connection(s). However, the access point 145 may additionally or alternatively provide Internet service via any other type(s) of connection. Further, the access point 145 may implement the WiFi connection via the IEEE 802.11g standard. However, any other past, present, and/or future system(s) and/or protocol(s) for communications may be used. In practice, the access point 145 is sometimes referred to as a local access point, and provides a local area network to the client devices. In the illustrated example, the access point includes a firewall that blocks all ports that are not within the Well Known Ports range as defined by IRNA (ports 1024 to 65535). However, the port(s) blocked by the firewall may be any other port(s), and may vary from access point to access point. For example, a security policy of a firewall of a corporate network (e.g., at an office or business) may be more restrictive and block more ports than a security policy of a firewall of a public network (e.g., a wireless access network hosted in a public location, such as a coffee shop).

In the illustrated example, the monitoring system 100 is shown as implemented with multiple computing systems. However, the monitoring system 100 may be comprised of any number of computing devices (e.g., one, two, etc.). In the illustrated example, the monitoring system 100 includes the registrar 155, the storage database 160, and the proxy 165. However, additional and/or alternative structures may be implemented to carry out one or more portions of the functionalities implemented by the registrar 155, the storage database 160, and/or the proxy 165, and/or other functions, and/or some or all of the components of the system 100 may be consolidated.

In the example of FIG. 1, the registrar 155 receives registration information from the panelist(s) 115, 135 and stores a record identifying the panelist 115, 135 and/or their respective client devices 110, 130. In the illustrated example, the received registration information includes demographic information. However, any other information may additionally or alternatively be collected. The registration information may include, for example, information identifying the model of mobile device associated with the panelist, a mailing address associated with the panelist, an email address associated with the panelist, a phone number associated with the mobile device, a unique identifier of the panelist and/or mobile device (e.g., a social security number of the panelist, a phone number of the mobile device, a zip code of the panelist, and/or any combination or derivation of any information related to the panelist and/or mobile device), the age of the panelist, the gender of the panelist, the race of the panelist, the income of the panelist, where the panelist intend to use their device, how long the panelist has owned their device, the education level of the panelist, any name of the panelist, and/or any other information related to the panelist and/or the mobile device.

In the illustrated example, the registration data is received by the registrar 155 via an electronic interface (e.g., by a panelist entering data into a form at a website or answering survey questions at a website). However, the registrar may receive the registration data via any other method and/or approach. For example, the registrar may receive the registration data via a personal interview (by telephone or in person), a telephone interface, direct mailing, purchased lists, etc. While the registrar 155 of the illustrated example is an electronic system, the registrar 155 may alternatively be implemented manually by a person or group of people collecting and entering the registration data into the storage database 160.

After receiving the registration data, the registrar 155 of the illustrated example creates a record associating the panelist and device identifier information with the collected demographic information. The registrar 155 if the illustrated example assigns a unique alphanumeric identifier to the panelist or device. The identifier may be based on, for example, a serial number of the client device. The record is stored in the storage database 160. In the illustrated example, the registrar 155 also assigns a unique port number to the panelist 115, 135 and/or the client device 110, 130 and stores the port number in the record (or in association with the record for that panelist and/or client device). As noted above, in addition to assigning and storing the port number, the registrar may assign and store additional identifiers. For example, the registrar may assign and store any identifier of the client device and/or the panelist. The panelist or client device identifier(s) may be the same as the port number, or they may be different from the port number. Further, when storing the port number in the storage database 160, the registrar may encode and/or encrypt the port number to provide security and/or anonymity to the panelists.

In addition to assigning and storing the credentials, the registrar 155 of the illustrated example generates an instruction document 156. In the illustrated example, the instruction document 156 instructs the panelist to configure the client device. The instruction document 156 in the illustrated example is an email message. However, any other type of instruction document may additionally or alternatively be used. For example, a portable document format (PDF) document and/or a Microsoft® Word® document may be sent to the panelist as an attachment to an email message. Further, the instruction document 156 may be custom generated for the particular type of mobile device based on the model of the mobile device as received by the registrar as part of the registration data. Additionally or alternatively, the instruction document may be generated for interpretation by an application residing on the mobile device such as, for example, a WiFi configuration application. In the illustrated example, an individual instruction document is generated on a per-panelist basis. For example, the first panelist 115 receives a first instruction document 156A while the second panelist 135 receives a second instruction document 156B. However, the instruction document 156 may not be generated on a per-panelist basis. For example, multiple instruction documents may be generated per panelist to, for example, provide different proxy configuration instructions and/or details for different wireless networks.

The instruction document 156 of the illustrated example includes an automatic configuration (auto-config) Universal Resource Locator (URL) that the panelist is instructed to enter into the client device. The auto-config URL defines a location of a proxy automatic configuration (PAC) file that is queried to retrieve the parameters to be used by the client device. The PAC file of the illustrated example is hosted and/or managed by the monitoring entity. The client device queries the auto-config URL periodically and/or a-periodically to apply the most current proxy settings. By using an auto-config URL the monitoring entity can modify proxy settings of a client device without the involvement of the panelist to thereby automatically modify the configuration parameters applied to the client device. Such modifications might be appropriate if, for example, a proxy was encountering an error that required traffic to be diverted to another proxy, a proxy was experiencing a heavy load and load balancing was required, etc. Alternatively, the instruction document might include configuration parameters such as the credentials, a port number, and/or an Internet proxy address to be used by the corresponding panelist and/or client device. In such a case, the panelist might be instructed to manually enter the configuration parameters. Alternatively, rather than containing the auto-config URL, the instruction document 156 could comprise the PAC file.

In some examples the instruction document includes and/or references a configuration file (e.g., an electronically readable file) that instructs the client device to apply the settings contained in the instruction document. In some examples, the configuration file is an Extensible Markup Language (XML) file implementing a property list (referred to herein as a plist) file comprising configuration data such as the credentials, a port number, and/or an Internet proxy address to be used by the corresponding panelist and/or client device. However, any other type of document may be generated such as, for example, a comma separated (CSV) document, a portable document format (PDF) document, a Microsoft® Word® document, etc. In some examples, the plist file is implemented for interpretation by an Apple® iPhone®, an Apple® iPod®, and/or an Apple® iPad™. However, the mobile device may be any other type of mobile device, and may accept any type of configuration file.

In the illustrated example, the instruction document and/or the configuration file is signed using a public/private key infrastructure. However, the instruction document and/or the configuration file may alternatively not be signed. If the instruction document and/or the configuration file is not signed, it may appear as invalid to the panelist, which may cause the panelist to abandon participation in the panel. The instruction document and/or the configuration file is sent to the corresponding client device (e.g., via an email message with the document and/or file attached, or with a link to the document and/or file). The client device may then interpret the data in the configuration file, thereby applying the data (e.g., the Internet proxy address and port number) to future communication of the mobile device. In the illustrated example, the configuration file causes the mobile device to send Internet traffic to the Internet address of the proxy 165 (e.g., a proxy server). As a result, Internet communications to and/or from the mobile device are addressed to the proxy server 165 and can be identified or associated with that particular client device.

As noted above in the illustrated example, the instruction document is transmitted to the panelist via an email message. However, any other method and/or approach of transmitting the instruction document to the panelist may additionally or alternatively be used. For example, an email message may be transmitted containing a hyperlink to the instruction document, the instruction document may be transmitted to the panelist via a Short Message Service (SMS) message, the instruction document may be mailed to the panelist, a direct mailing may be sent to the panelist comprising the instruction document and/or additionally comprising an electronic medium containing the instruction document, and/or a telephone call may be placed to the panelist to instruct the panelist to configure the client device.

The example registrar 155 of FIG. 1 is implemented by a processor executing instructions, but it could alternatively be implemented by an ASIC, DSP, FPGA, or other circuitry. The example storage database 160 of FIG. 1 receives and stores identifiers associating the panelists 115, 135 with the client devices 110, 130 from the registrar 155. Additionally, the storage database 160 receives and stores monitoring data from the proxy server 165. The monitoring data is associated with the corresponding panelist and/or client device via the port associated with the panelist. In some examples, the storage database 160 is also capable of storing data that is not identifiers and/or measurement data. For example, updated software and/or updated firmware for any component of the monitoring system 100 may be stored in the storage database 160. Further, in some examples the storage database 160 is capable of storing information that enables the registrar 155 to generate the instruction document. For example, the storage database 160 may store registration information such as the model of the client device 110, 130. Additionally, in some examples the storage database 160 stores demographic data as collected by the registrar 155.

The storage database 160 may be any device for storing data such as, for example, flash memory, magnetic media, optical media, etc. Furthermore, the data stored in the storage database 160 may be in any data format such as, for example, binary data, comma delimited data, tab delimited data, structured query language (SQL) structures, etc. While in the illustrated example the storage database is illustrated as a single database, the storage database 160 may be implemented by multiple databases.

The proxy 165 of the illustrated example receives requests from the client devices 110, 130 via the access point 145. The requests of the client devices 110, 130 are received by the proxy 165 due to proxy settings of the instruction document 156 having been applied to respective ones of the client device(s) to thereby instruct the client device to transmit all subsequent requests through the proxy 165. In the illustrated example, the proxy 165 receives Internet content requests via at least one Well Known Port (e.g., port 0 through port 1023). By only using Well Known Ports, it is less likely that the Internet communications will be blocked by a firewall. While in the illustrated example, a single proxy 165 is used, any number of proxies may implement the proxy 165 of FIG. 1. A limiting factor to the number of panelists that can be serviced is the processing power of the proxy 165. The size of the panel can be expanded by using additional proxies at other Internet addresses. The additional proxies at other Internet addresses may be implemented by the same proxy server 165 or by multiple proxies. For example, the proxy server 165 may have multiple Internet addresses assigned to a network interface of the proxy server 165 (e.g., virtual interfaces), or the proxy server 165 may have multiple network interfaces each having an Internet address. While in the illustrated example ports within the Well Known Ports range are used, any other ports may additionally or alternatively be used. For example, ports within the Registered Ports range and/or the Dynamic and/or Private Ports range may potentially be used to accept requests for Internet content from the panelists. In a scenario where a panel monitoring system such as the monitoring system 100 is being tested, a typical panel will include at least sixty panelists. In a scenario where an ongoing panel is used a panel size of at least 1,500 panelists may be used.

Upon receiving a request from a client device 110, 130, the proxy server 165 retrieves the requested Internet content from the Internet content providers 170 (or from a local cache if, for example, the subject Internet content had previously been requested and stored). In order to identify the panelist associated with the request, communication to and from each specific panelist occurs over the uniquely assigned (e.g., dedicated) port. While the communication between a client device 110, 130 and the proxy server 165 occurs over a single port (e.g., the port assigned to that client device 110, 130 by the registrar 155), communication between the proxy server 165 and the Internet content providers 170 may be implemented over any port. Typically, the port used by the proxy server to communicate with content providers 170 is limited to hypertext transfer protocol (HTTP) data that occurs over port 80. After retrieving the requested Internet content from the Internet content provider(s) 170, in the illustrated example the content is relayed to the requesting client device 110, 130 via the port assigned to the corresponding client device. Additionally or alternatively, the content may be relayed to the requesting client device 110, 130 via a port other than the assigned port (e.g., via port 80).

The proxy server 165 of the illustrated example stores the requests for Internet content and/or portion(s) of such requests originating from the client devices 110, 130 in the storage database 160 in association with the port with which the request was received. In storing the requests, the proxy 165 may additionally store other identifiers such as, for example, the identifier of the client device 110, 130, the identifier of the panelist 115, 135, the port provided by the client device 110, 130, and/or the classification of the access point associated with the panelist, proxy server, and/or port. When used in combination with the identifier of the client device 110, 130, the identifier of the panelist 115, 135, the port number used by the client device 110, 130, and/or the classification of the access point indicates the location of the panelist 115, 135 and/or the client device 110, 130. In particular, the location of the client device 110, 130 can be determined by using any one of these data points to look up the classification of the access point.

Additionally or alternatively, the proxy 165 may store a portion of the Internet content provided to the requesting client device in the storage database 160. For example, the proxy 165 may store some or all of the body of a webpage transmitted to the client device 110, 130. In another example, the proxy 165 may additionally or alternatively store an identifier of an advertisement appearing on the webpage transmitted to the client. This is particularly useful in situations where advertisements are rotated at websites. Additionally or alternatively, the proxy 165 may store characteristics of the response, such as, for example the HTTP header, a status code of the HTTP header, a content type of the HTTP header, etc.

The Internet content providers 170 of the illustrated example supply content to clients via the Internet. In the illustrated example, the proxy 165 acts an intermediary for the client devices 110, 130, and, thus, is the client of the Internet content providers 170. Internet content is often supplied over port 80, as most Internet content is in the form of HTTP data. However, any other port may be used to supply Internet content. For example, File Transfer Protocol (FTP) data may be transmitted over port 21, HTTP over Secure Socket Layer (SSL) may be transmitted over port 443, etc.

The Internet content providers 170 can be any provider. For example, the Internet content providers 170 may comprise a web server hosting webpages formatted as Hypertext Markup Language (HTML) content. Alternatively, the Internet content provider 170 may be an application server providing application content to applications accessing Internet content. The application content may be formatted as HTML, XML, or may use any other past, present, or future format, or may use any other port to return content to the requester. In some examples, the application content is implemented without using a standard protocol.

Figure 1A:
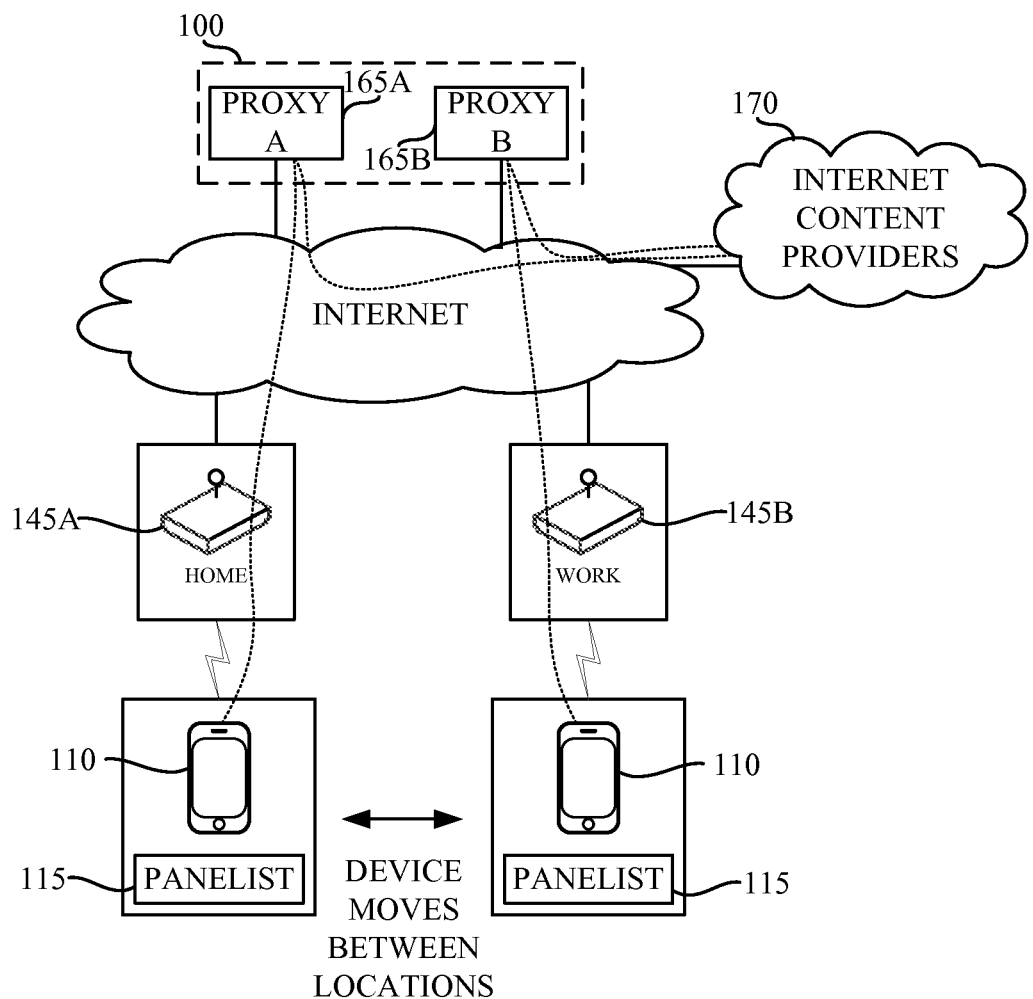
FIG. 1A is a block diagram of an example implementation of the example system as shown in FIG. 1.

FIG. 1A is a block diagram of an example implementation of the example system as shown in FIG. 1. The example implementation shown in FIG. 1A includes a first proxy 165A, a second proxy 165B, a first access point 145A, and a second access point 145B. In the illustrated example, the first access point 145A hosts Internet connectivity for a home network, while the second access point 145B hosts Internet connectivity for a work network. While in the illustrated example, the access points 145A and 145B are associated with home and work networks, the access points 145A and 145B might be associated with any other network(s) such as, for example, a network at a public location (e.g., a coffee shop, an airport, etc.) and/or a network at a private location (e.g., a school, a gym, etc.). Further, any number of access points (including, for example, one, two, three, etc.) and any number of proxies may exist.

The access points 145A and 145B are typically identified by a Service Set Identifier (SSID). However any other wireless network identifier may additionally or alternatively be used. The SSID of the access points 145A and 145B are typically human readable, and thus known by the panelist 115 such that the panelist 115 can differentiate a first network from a second network. The instruction document provided to the panelist 115 in the illustrated example instructs the panelist 115 to enter configuration parameters (e.g., a first auto-config URL) into the client device 110 identifying the first proxy 165A while connected to a home network, such as the first access point 145A. The panelist 115 may additionally be instructed to enter different configuration parameters (e.g., a second auto-config URL) identifying the second proxy 165B while connected to a work network, such as the second access point 145B. Thus, when the panelist 115 moves between networks (e.g., from a home network to a work network), the example system 100 is able to monitor the change and record usage statistics appropriately.

As the panelist 115 and/or client device 110 move between the access points 145A and 145B, the client device 110 communicates via different proxies 165A and 165B. Information stored by the proxies 165A and 165B is then used to determine usage behaviors for different locations. For example, effectiveness of an advertisement might be different when the client device 110 communicates via the first access point 145A (e.g., the panelist 115 is at home) versus when the client device 110 communicates via the second access point 145B. In some examples, an advertisement for business services might be more effective when the panelist 115 is at work, as compared to an advertisement for groceries which might be more effective when the panelist 115 is at home. Additionally or alternatively, different types of Internet usage (e.g., leisure related versus work related) might be observed at these different access points.

Figure 2:
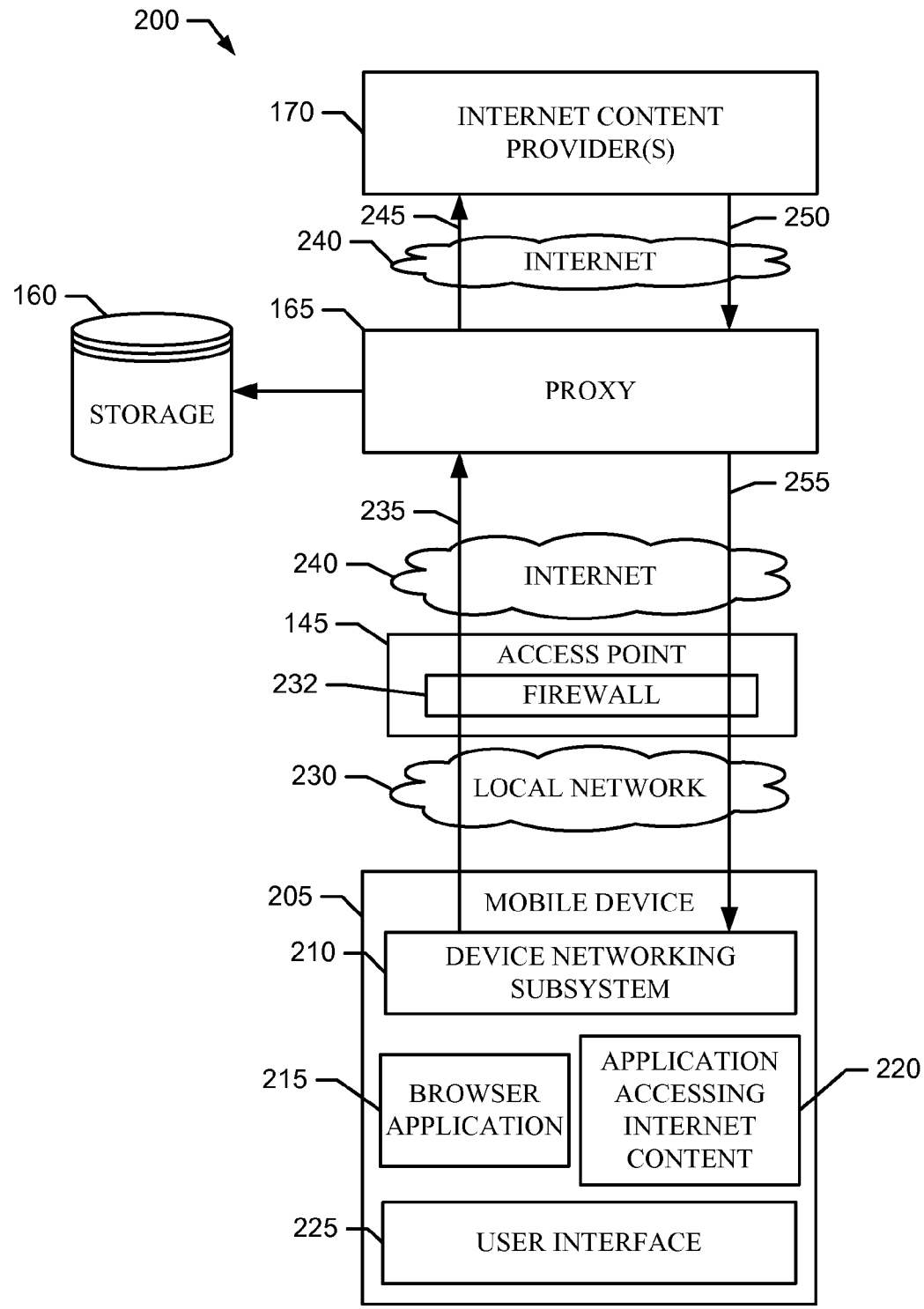
FIGS. 2 and 2A are a block diagrams illustrating an example request and response flow through the example system of FIG. 1.

FIG. 2 is a block diagram 200 illustrating an example request and response flow through the example system of FIG. 1. The block diagram 200 of FIG. 2 illustrates communication between a mobile device 205, a local network 230, the access point 145, a firewall 232, the proxy 165, the storage database 160, the Internet 240, and the Internet content providers 170. The mobile device 205 represents either of the client devices 110, 130 and comprises a device networking subsystem 210, a browser application 215, an application accessing Internet content 220, and a user interface 225. Additionally, the block diagram illustrates a first request 235, a second request 245, a first response 250, and a second response 255.

The device networking subsystem 210 of the illustrated example provides a framework for transmitting and receiving content. The example device networking subsystem 210 of FIG. 2 may be implemented via an application processor, a software system that facilitates networked communication, a browser engine, a baseband processor that transmits network traffic, and/or any other system that provides a framework for transmitting and receiving content. In the illustrated example, the device networking subsystem is implemented by the networking libraries provided in the Apple® iPhone® operating system. However, any other past, present, or future libraries, systems, or programs may additionally or alternatively be used.

In the illustrated example of FIG. 2, the browser application 215 and application accessing Internet content 220 are executed by a processor of the mobile device 205. The browser application 215 requests HTTP Internet content from one or more Internet content provider(s) 170, and renders the HTTP content for display. Additionally or alternatively, the browser application may request and render HTTPS Internet content. In some examples, the browser application is implemented by Apple® Safari®. However, any other application may additionally and/or alternatively be used. For example, Pocket Internet Explorer may be used. In some examples, the Internet content is HTML content. However, the content may be presented in any past, present, or future format that may be rendered by the browser application 215.

The example application accessing Internet content 220 may be any application on the mobile device that requests Internet content. For example, the application accessing Internet content 220 may be a weather application accessing Internet content provided by www.weather.com. The Internet content provider 170 providing content for www.weather.com may respond to content requests with HTML data. However, any other type of data may be contained in the content request. For example, the Internet content provider 170 providing content for www.weather.com may provide an XML file containing a condensed weather forecast. Additionally or alternatively, the application accessing Internet content 220 may request media such as, for example, photos, video, audio, etc. Typically, applications accessing Internet content 220 are limited to a small amount of information to be displayed. For example, the weather application may not be able to display sports news. Although the browser 215 or the application accessing Internet content 220 may initiate requests for content, in some devices, such as the Apple® iPhone®, requests are formatted and/or transmitted by the device networking subsystem 210 based on system wide settings that control routing and/or addressing of such requests (e.g., to a specific port of a proxy 165).

The user interface 225 of the illustrated example provides a display to the user and receives input from the user. The user interface 225 may comprise hardware, a graphics library, and/or a graphics driver for displaying content to the panelist, and/or may comprise hardware, an input library, and/or an input driver for receiving input from the panelist. In the example of FIG. 2, either or both the browser application 215 and the application accessing Internet content 220 may utilize the user interface to display content and receive input.

In the illustrated example, the local network 230 is hosted by the access point 145. As shown in FIG. 1A, different access points 145A, 145B may be used at different locations. In the illustrated example, the local network 230 is an Internet Protocol (IP) version 4 (IPv4) based network. However, any other past, present, or future networking technology may additionally or alternatively be employed. For example, the local network 230 may implement the IP version 6 (IPv6) protocol. Further, the local network 230 of the illustrated example is implemented using communication links 120, 140. While WiFi connections are shown, any other past, present, or future method(s) of communication may additionally or alternatively be used such as, for example, an Ethernet network, a cellular network, etc. Additionally, the local network 230 is shown as a public network. However, the network may be a private network.

The firewall 232 of the illustrated example applies security policies to the requests and responses passing through the firewall 232. In some examples, the firewall 232 may only allow communications over the Well Known Ports (e.g., ports 0 to 1023), as the ports may be believed to not have security risks. In the illustrated example, if communication on a port is not allowed to pass through the firewall 232, the communication is not transmitted from the requesting client device to the proxy 165.

In the illustrated example, the firewall 232 is a component of the access point 145. However, the firewall may additionally or alternatively be separate from the access point 145.

The Internet 240 in the illustrated example is a public network. However, a private network may instead be deployed. For example, a network internal to an organization and/or company may be used. Monitoring communications associated with such an internal network might be useful to, for example, determine how members of the organization and/or employees of the company utilize internal web content via mobile devices.

Figure 2A:
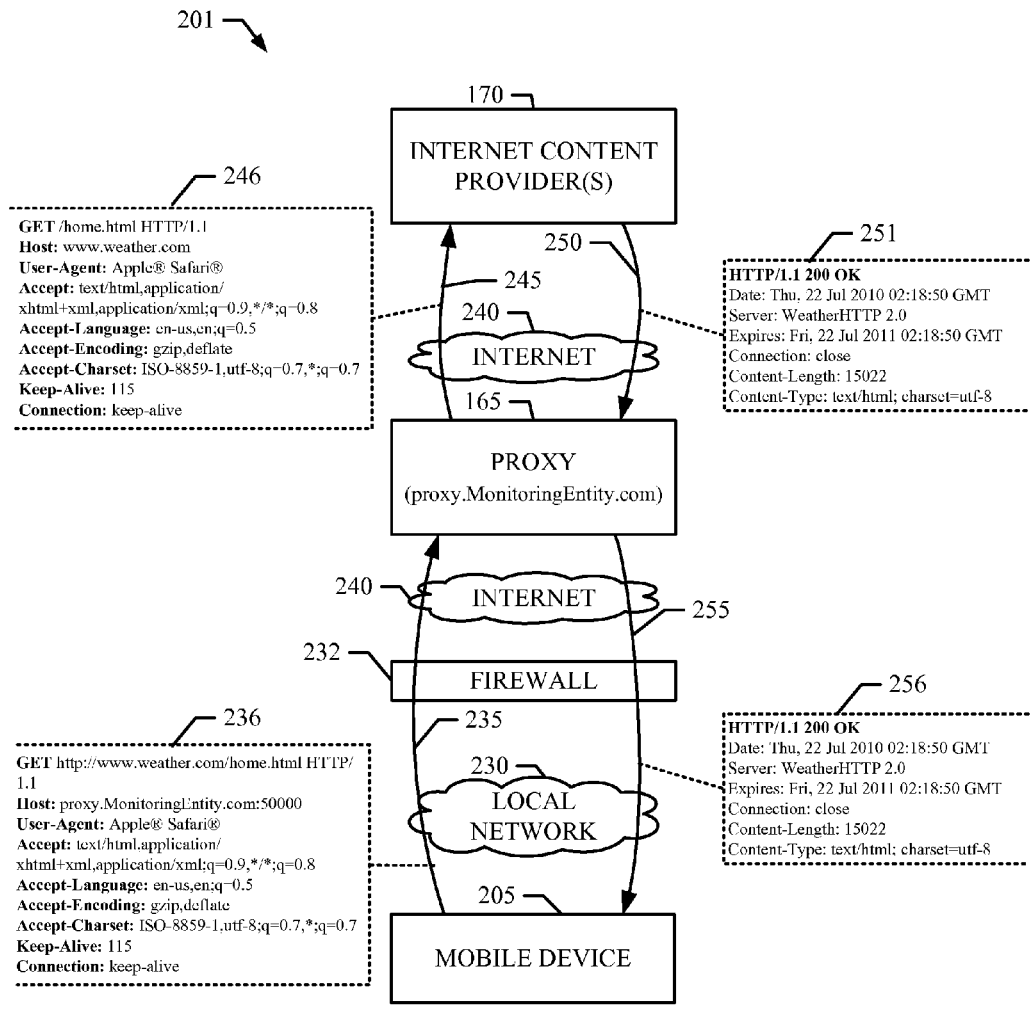

The illustrated example shows a communication stream for a single request. The first request 235 is transmitted to the proxy 165 from the mobile device 205 over the local network 230 and through the firewall. The first request 235 uses a port that is uniquely assigned to the panelist and/or client device in association with the access point. In the illustrated example, the first request 235 is made via port 50,000. However, any other port might alternatively be used. The proxy 165, upon receiving the first request 235, stores some or all of the request in the storage database 160, and generates a second request 245. The second request 245 is effectively a translation of the first address as shown in FIG. 2A. The second request 245 is addressed to the Internet content provider 170 identified in the first request 235. The second request 245 in the illustrated example is transmitted via the Internet 240 over port 80, as the first request 235 identified content to be served over port 80. The Internet content provider 170 responds to the second request 245 with the first response 250. In the illustrated example, the proxy 165 receives the first response 250 via port 80, stores some or all of the request in the storage database 160, and forwards the content of the first response 250 as the second response 255 to the mobile device 205 over the port assigned to the mobile device 205.

FIG. 2A is a block diagram 201 illustrating an example request and response flow through the example system of FIG. 1. The block diagram 201 includes the proxy 165, the Internet content provider(s) 170, the mobile device 205, the carrier network 230, and the Internet 240. The block diagram 201 additionally illustrates a first request 235, a second request 245, a first response 250, and a second response 255. Further, the requests and responses of the illustrated example are represented by HTTP request and response headers. The first request 235 is represented by the first HTTP request header 236 and the second request 245 is represented by the second HTTP request header 246. The first response 250 is represented by the first HTTP response header 251 and the second response 255 is represented by the second HTTP response header 256.

The first HTTP request header 236 is the header of a GET request generated by the mobile device 205. In the illustrated example, the Internet content provider 170 is identified by the absolute (i.e., non-relative) Universal Resource Locator (URL) identified in the first line of the first HTTP request header 236. The address of the proxy 165 and the uniquely assigned port are identified by the "Host" line of the first HTTP request header 236. The host identified in the illustrated example is "proxy.MonitoringEntity.com", and the port that the request was made on is "50,000". However, any other address identifying the proxy 165, and any other port may alternatively be used. For example, the address identifying the proxy 165 may be the Internet Protocol (IP) address of the proxy 165. In the illustrated example, the absolute URL of the Internet resource is "http://www.weather.com/home.html". However, any other URL may additionally or alternatively be used. An absolute URL is shown in the GET line of the first request 236 of FIG. 2A. The URL is not relative as the GET line is independent of the host line of the first request 236. In contrast, a relative URL is shown in the second request 246 of FIG. 2A. The URL is relative as the GET line identifies an internet resource that is relative to the host indicated by the host line.

In the illustrated example, the proxy 165 receives the first request 235 for Internet content from the mobile device, retrieves the content by sending the second request 245 to the corresponding content provider 170, receives the content in the first response 250 from the content provider 170, and relays the content to the mobile device 205 via the second response 255. In the illustrated example, the proxy 165 stores one or more characteristic(s) and/or identifier(s) of the request and/or response in the storage database 160. These characteristics and/or identifiers may be, for example, time(s) of transmission of the request(s) and/or response(s), an IP address of the client, a user agent of the request, a status code of the response, a content type of the response, etc. However, the proxy 165 may additionally or alternatively store the Internet content of the response in the storage database 160. In relaying the request, the proxy 165 of the illustrated example translates the port of the requests, as is described below in conjunction with FIG. 2A.

As mentioned above, the proxy 165 of the illustrated example receives the first content request 235 and generates the second content request 245. The second content request 245 is represented by the second HTTP request header 246. In the illustrated example, the second HTTP request header 246 is a GET request directed to "http://www.weather.com", and is transmitted over port 80 as no port other than port 80 is identified. The content being requested from "http://www.weather.com/" in the illustrated example is "/home.html". In the illustrated example, the proxy generates the contents of the second request 245 based on the first request 235. For example, the proxy 165 identifies the requested content of the first request 235 as "http://www.weather.com/home.html", determines that the port to be translated to is port 80 (identified by http://), determines that the Internet content provider 170 is "www.weather.com", and determines that the requested webpage from the Internet content provider is "/home.html". In the example of FIG. 2A, The second content request 245 is transmitted over port 80 because the proxy 165 determines that the requested content is HTTP content, and no alternative port number is specified. Alternatively, the content identified by the first content request 235 may be content that is provided on a port other than port 80. In such examples, the absolute URL of the first HTTP request header 236 would identify the requested content as "http://www.weather.com:1234/home.html", to convey that the content identified by the request is provided on port 1234 (other examples can use other port numbers). In such an example, the proxy 165 generates the second HTTP request header 246 and includes port 1234 in the identified host (e.g., www.weather.com:1234).

In the example of FIG. 2A, the Internet content provider 170 receives the second content request 245, and responds to the request via the first response 250. The first response 250 is transmitted to the proxy 165. In the illustrated example, the first response is transmitted over port 80, as it is a response to a content request made on port 80. However, any other port may be used to transmit the first response to the proxy 165. The proxy 165 receives the first response 250, and determines the correct port that the second response 255 should be transmitted over. In the illustrated example, the proxy 165 determines the port that the second response should be transmitted over by associating the first response 250 with the first request 235 via the second request 245. In such an example, the proxy 165 can identify that the first request 235 originated on port 50,000, and thus, the second response should be transmitted on port 50,000. However, any other method of determining the port to transmit the second response over may additionally or alternatively be used. Further, the response may be transmitted over a port other than the port assigned to the mobile device 205.

Figure 3:
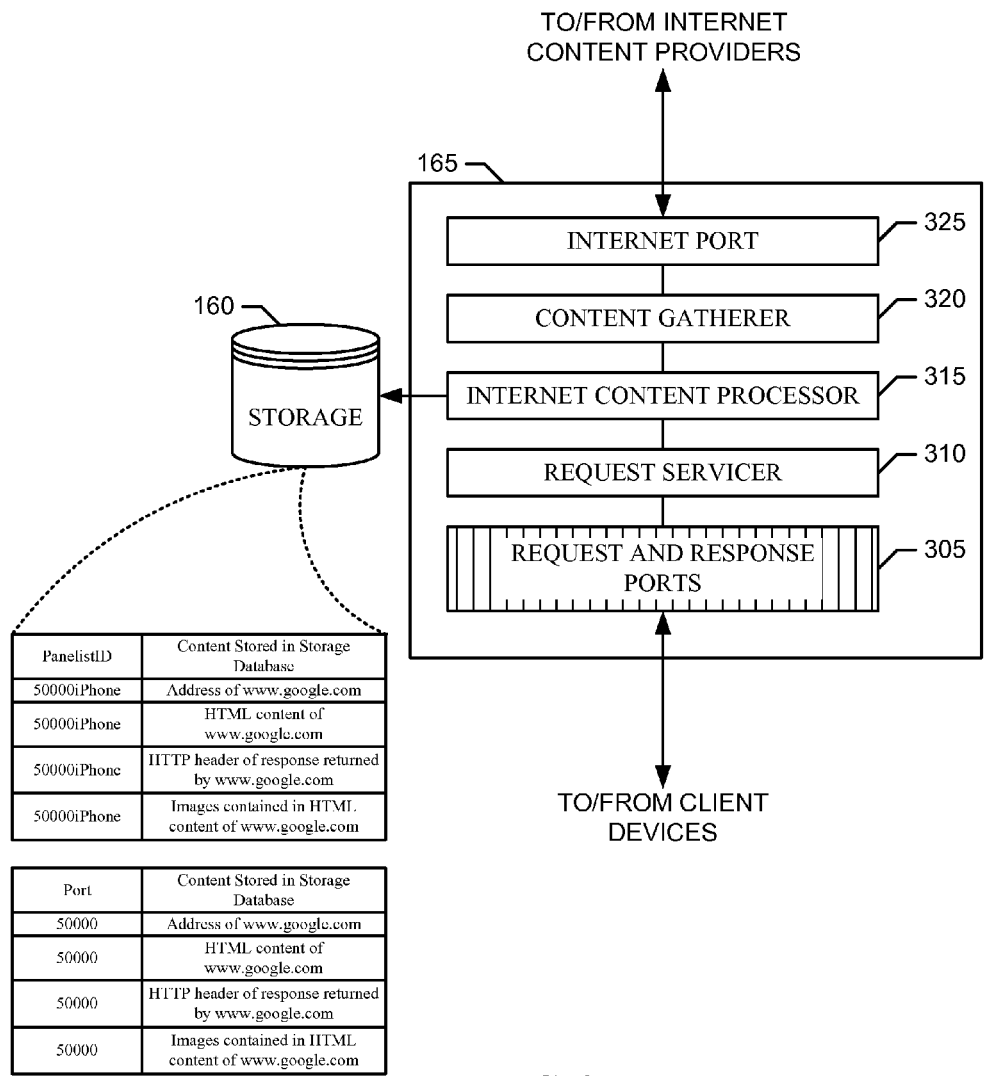
FIG. 3 is a block diagram of the example proxy of FIG. 1.

FIG. 3 illustrates an example implementation of the example proxy 165 of FIG. 1. The example proxy 165 includes request and response ports 305, a request servicer 310, an Internet content processor 315, a content gatherer 320, and an Internet port 325. The request and response ports 305 receive requests and transmit responses to and/or from the client devices 110, 130. The requests received by the ports 305 are passed to the request servicer 310. The content gatherer 320 transmits requests and receives responses from the Internet content providers 170 via the Internet port 325. The Internet content processor 315 stores the requests (an/or portions thereof and/or identifiers associated therewith) and/or the retrieved content (and/or portions thereof and/or identifiers associated therewith) in the storage database 160.

The request and response ports 305 of the illustrated example are Transmission Control Protocol (TCP) ports and/or User Datagram Protocol (UDP) ports. However, any other past, present, and/or future protocol may additionally or alternatively be used. The request and response ports of the illustrated example are Dynamic and/or Private Ports as defined by IRNA. As such, the ports 305 range from port 49152 to port 65535, inclusive. However, the ports may use only some of this range (and the used portions may or may not be contiguous) and/or the ports may additionally or alternatively include ports in any other range such as, for example, Well Defined Ports (ranging from port 0 to port 1023) and/or Registered Ports (ranging from port 1024 to port 49151).

The request servicer 310 of the illustrated example receives the requests from the request and response ports 305 and performs a port translation. A port translation may not be necessary in the event that the proxy is hosted via the same port that the requested content is hosted on. For example, if the proxy is hosted on port 50,000 and the content request is for content provided on port 50,000 (e.g., "GET http://www.weather.com:50000/home.html"), no port translation will occur. The request servicer 310 performs the translation by first inspecting the request to determine the destination port that is intended for communication with the Internet content provider 170. For example, in many situations, the request will be for HTTP content and the destination port will be identified as port 80. However, any other destination port may be employed. For example, FTP traffic may be translated to port 21. The content gatherer 320 is responsible for requesting the content identified in the first request (e.g., by sending translated requests to the corresponding content provider). Once the requested content is received from the Internet content provider 170 (or a local cache, if available), the request servicer 310 performs another port translation on the received content to generate a translated response. The translated response is sent to the client device over the port assigned to the client device that made the request.

The Internet content processor 315 of the illustrated example determines the port (e.g., port 50,000) that the first request was received on, and stores the first request in the storage database 160 in association with the port to uniquely identify the client device. When multiple ports are assigned to a single panelist, the Internet content processor 315 of the illustrated example associates a location of the panelist with the port number that the request was received on. For example, a first port might be used for communication a home access point of the panelist and a second port might be used for communication at work for that same panelist. Additionally or alternatively, the Internet content processor 315 of the illustrated example uses the port number to determine and store the panelist ID and/or the client device ID that was generated by the registrar 155 upon registration. In the illustrated example, the Internet content processor 315 stores the request for content. However, the Internet content processor 315 may store less than the entire request, a symbol for the request, etc., as shown in the tables of FIG. 3. Additionally or alternatively, the Internet content processor 315 may store the content provided in the response and/or segments and/or portions of the content provided in the response in the storage database 160. For example, the Internet content processor 315 may store advertisements (or other content of interest) transmitted to the client device in the storage database 160.

In addition to storing information related to the communication of the panelist and/or client device, the Internet content processor 315 of the illustrated example stores information related to the proxy 165. In the illustrated example, the information related to the proxy 165 is an IP address and port hosting the communications. However, any other identifier may additionally or alternatively be used. For example, a hostname of the proxy 165 might be used. In the illustrated example, the information related to the proxy 165 is later used to associate communications of the panelist and/or client device with a location of the panelist and/or client device if more than one port has been assigned to different access points used by that panelist. In particular, the information related to the proxy 165 is used to identify the proxy 165 that the panelist and/or client device was to be communicating with at a given time. Further, since the proxy 165 that the panelist and/or client device communicates with may change over time by management of the proxy configuration settings (e.g., via the PAC file) associated with the auto-config URL (e.g., for load balancing and/or failure management purposes), the location of the panelist and/or client device can be determined. For example, periodically and/or a-periodically, the client device may query the auto-config URL to apply the latest proxy configuration settings (e.g., via the PAC file). A change in the proxy configuration settings might cause the panelist and/or client device to be associated with a different proxy 165. Additionally or alternatively, the Internet content processor 315 may determine and store the location of the panelist (e.g., 'home', 'work', etc. . . . ) rather than waiting to determine the location at a later time.

The content gatherer 320 of the illustrated example requests the content identified by the request for Internet content. In particular, the content gatherer 320 utilizes the Internet address of the content requested in the request via one of the ports 305 to generate a second request to gather the requested Internet content. The content gatherer 320 transmits the second request via the Internet port 325. The Internet port 325 of the illustrated example is a Transmission Control Protocol (TCP) port and/or a User Datagram Protocol (UDP) port. However, any other port-based system may additionally or alternatively be used. The Internet port of the illustrated example is for HTTP traffic (e.g., port 80). However, any other port may be used. For example, port 21 could be used for File Transfer Protocol (FTP) traffic.

While an example manner of implementing the proxy 165 of FIG. 1 has been illustrated in FIGS. 1 and 3, one or more of the elements, processes, and/or devices illustrated in FIG. 3 may be combined, divided, re-arranged, omitted, eliminated, and/or implemented in any other way. Further, the request and response ports 305, the request servicer 310, the Internet content processor 315, the content gatherer 320, the Internet port 325 and/or, more generally, the example proxy 165 of FIG. 3 and/or the example registrar 155 of FIG. 1 may be implemented by hardware, software, firmware, and/or any combination of hardware, software, and/or firmware. Thus, for example, any of the example request and response ports 305, the example request servicer 310, the example Internet content processor 315, the example content gatherer 320, the example Internet port 325 and/or, more generally, the example proxy 165 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example request and response ports 305, the example request servicer 310, the example Internet content processor 315, the example content gatherer 320, the example Internet port 325, the example proxy 165, the example registrar 155, and/or the storage database 160 are hereby expressly defined to include hardware and/or a computer readable medium such as a memory, DVD, CD, etc. storing the software and/or firmware. Further still, the example proxy 165 of FIGS. 1 and 3 may include one or more elements, processes, and/or devices in addition to, or instead of, those illustrated in FIG. 3, and/or may include more than one of any or all of the illustrated elements, processes, and devices.

Figure 4:
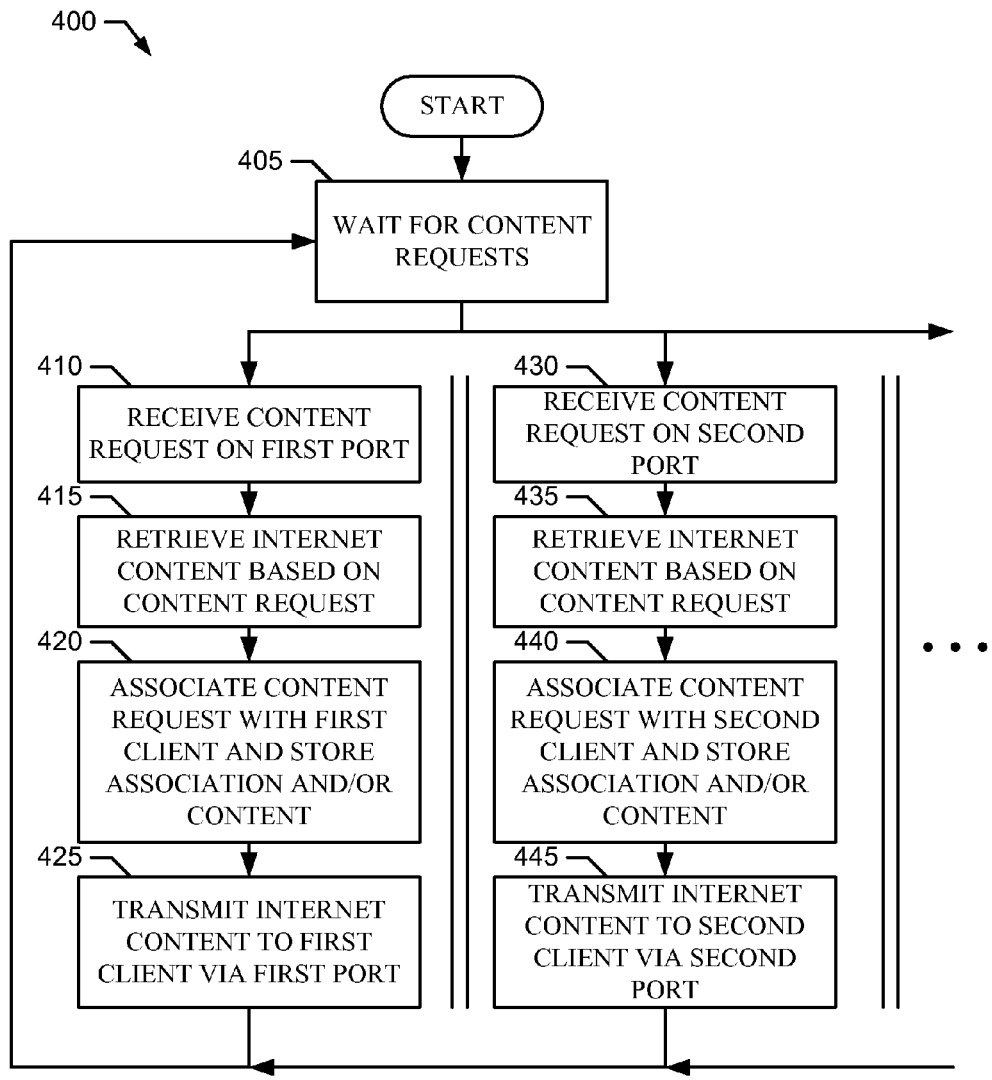
FIG. 4 is a flowchart representative of example machine-readable instructions that may be executed to implement the example proxy of FIGS. 1, 2, and/or 3.
Figure 5:
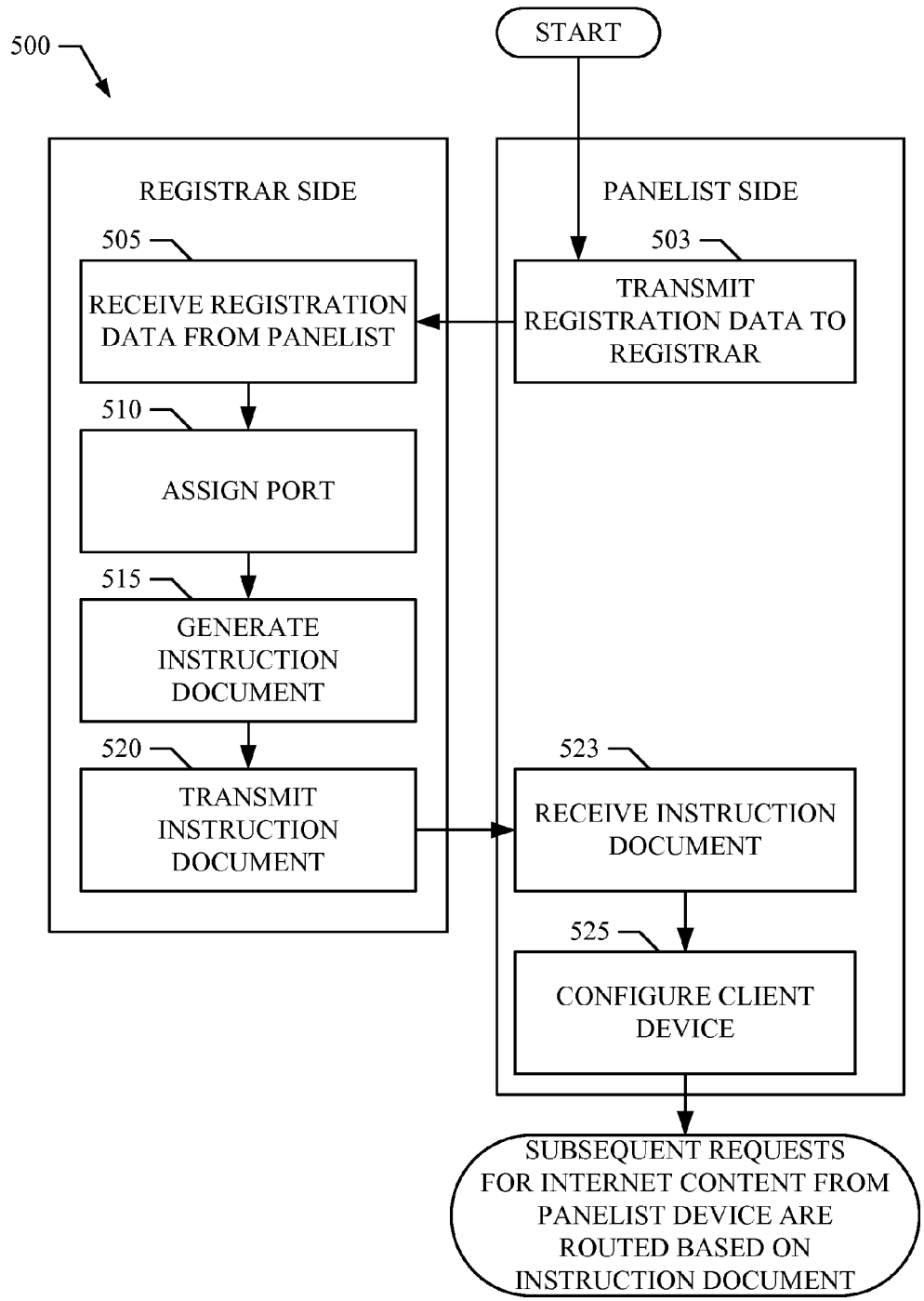
FIG. 5 is a flowchart representative of example machine-readable instructions that may be executed to implement the example registrar of FIG. 1.
Figure 6:
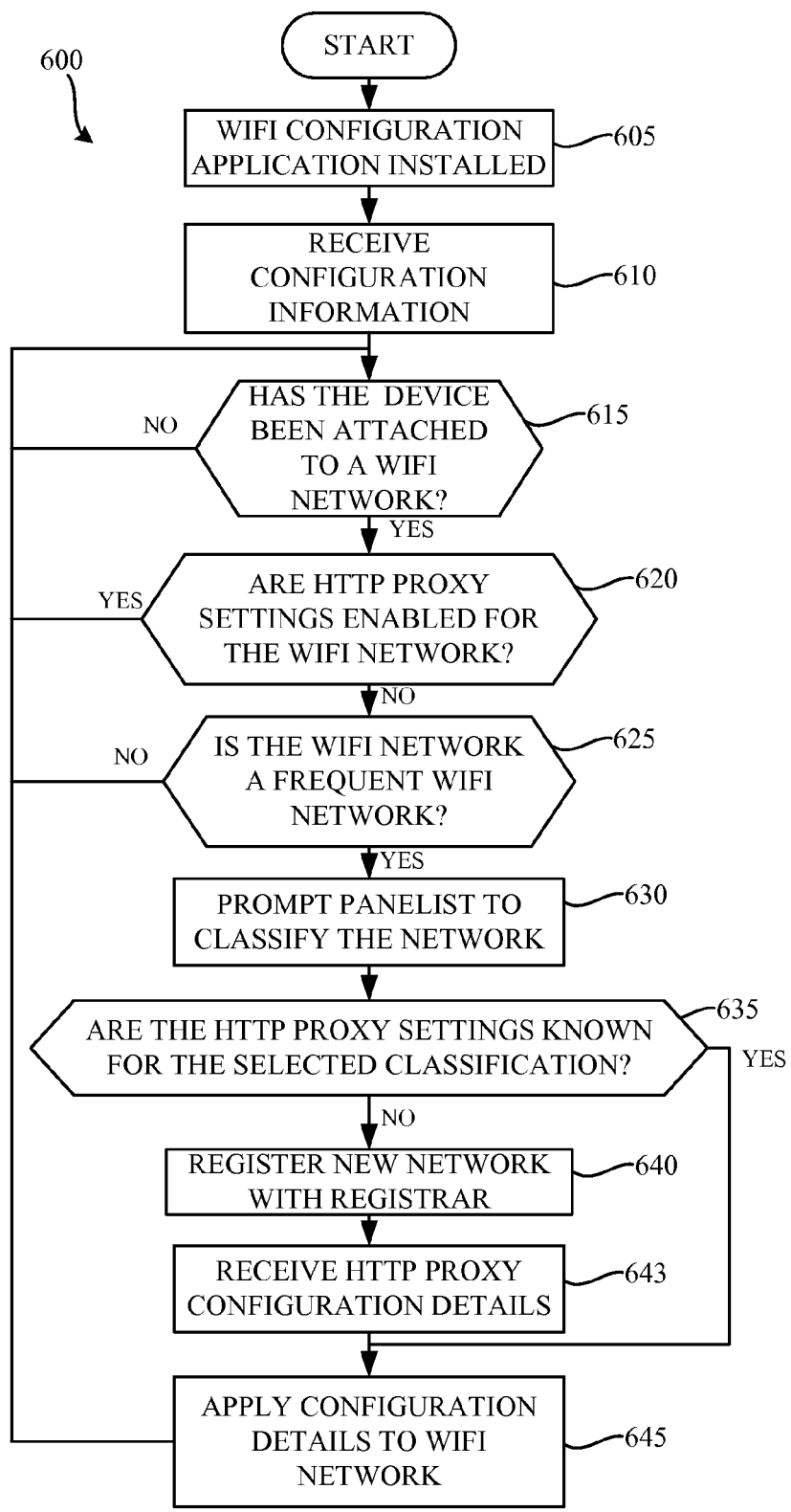
FIG. 6 is a flowchart representative of example machine-readable instructions that may be executed to implement an example client device of FIG. 1.

A flowchart representative of example machine-readable instructions for implementing the proxy 165 of FIGS. 1 and/or 3 is shown in FIG. 4. Further, a flowchart representative of example machine-readable instructions for implementing the registrar 155 of FIG. 1 is shown in FIG. 5. Further still, a flowchart representative of example machine-readable instructions for implementing the mobile device 205 is shown in FIG. 6. In these examples, the machine-readable instructions comprise program(s) for execution by a processor such as the processor 712 shown in the example computer 700 discussed below in connection with FIG. 7. The program may be embodied in software stored on a computer readable medium such as a CD-ROM, a floppy disk, a hard drive, a digital versatile disk (DVD), or a memory associated with the processor 712, but the entire program(s) and/or parts thereof could alternatively be executed by a device other than the processor 712 and/or embodied in firmware or dedicated hardware. Further, although the example program(s) are described with reference to the flowcharts illustrated in FIGS. 4, 5, and 6, many other methods of implementing the example proxy 165, the example registrar 155, and/or the mobile device 205 may alternatively be used. For example, the order of execution of the blocks may be changed, and/or some of the blocks described may be changed, eliminated, or combined.

As mentioned above, the example processes of FIGS. 4, 5, and 6 may be implemented using coded instructions (e.g., computer-readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer readable storage and to exclude propagating signals. Additionally or alternatively, the example processes of FIGS. 4, 5, and 6 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

FIG. 4 is a flowchart representative of example machine-readable instructions 400 that may be executed to implement the example proxy of FIGS. 1, 2, and 3. The program of FIG. 4 begins at block 405, where the example machine-readable instructions 400 begin execution. First, the request servicer 310 of the proxy 165 waits for content request(s) (block 405). In the illustrated example, the request servicer 310 waits for content requests only on ports assigned to a client. However, the request servicer 310 may wait for content requests on any or all ports. Additionally, the request servicer 310 may inspect the Internet Protocol (IP) address against known range(s) of IP addresses to determine if the request should be serviced. For example, the known range of IP address may include ranges of IP addresses which are assigned to a particular access point. This may, for example, restrict use of the proxy 165 to mobile devices. In some examples, if the request servicer 310 determines that the request did not originate from an IP address within the particular access point, the request servicer 310 ignores the request. In some examples, the request servicer 310 inspects other aspects of the content request(s) to determine if the request should be serviced. For example, the User Agent field of the incoming request(s) may be inspected to determine whether the request is coming from an appropriate client. In some examples, the request(s) are not serviced when the data and/or the value in the User Agent field matches the User Agent value associated with a desktop browser (e.g., Mozilla Firefox, Microsoft Internet Explorer, etc). Further, other User Agents might be used such as, for example, User Agents associated with mobile devices other than the Apple® iPhone®, Apple® iPad™, etc.

Next, the request servicer 310 receives a content request on a port (block 410). Because multiple requests for content may be received at substantially the same time, the proxy 165 may receive a first content request on a first port (block 410) and a second content request on a second port (block 430). In the illustrated example, the content requests are processed in parallel to decrease the amount of time taken to respond to requests. However, the content requests may be processed in any other manner. For example, the content requests may be processed serially. The parallel processing of any number of requests is represented in FIG. 4 by these dots "•••".

Next, the content gatherer 320 generates second request(s) based on corresponding ones of the request(s) received at blocks 410 and 430. The secong requests are generated to retrieve the Internet content identified in the corresponding content requests (blocks 415 and 435). The content gatherer 320 sends the second requests via the Internet port 325. In the illustrated example, port 80 is used for sending the second requests. However, any other port may additionally or alternatively be used.

The Internet content processor 315 associates the content requests with the corresponding requesting device and stores the association in the storage database (blocks 420 and 440). In the illustrated example, the Internet content processor 315 associates the first content request with the corresponding client device using the port number that the request was received upon. Since each port is used only by a single client device, each client device can be uniquely identified based on the port number of the port on which a request is received. Further, when storing the association in the storage database 160, the Internet content processor 315 may store one or more identifier(s) of the port, the client device, the panelist, etc. Additionally, the Internet content processor 315 may store the returned content or a portion of the returned content in the storage database 160 (block 420, 440).

The Internet content processor 315 may filter what is stored in the storage database. For example, the Internet content processor 315 may only store content requests that request HTTP content, as requests for non-HTTP content may not be parsed properly when analyzing the information. As another example, the Internet content processor 315 may omit style content (e.g., cascading style sheet (CSS) documents) from being stored in the storage database 160, as style content may be of limited use when analyzing the information.

The request servicer 310 finishes servicing the request from the client device by transmitting the requested Internet content to the client device via the port on which the content request was received (blocks 425 and 445). Control then returns to the block 405, where the request servicer 310 waits for more content requests (block 405).

FIG. 5 is a flowchart representative of example machine-readable instructions 500 that may be executed to implement the example registrar 155 of FIG. 1. The example machine-readable instructions 500 of FIG. 5 begin execution at block 503, where the registration data is transmitted to the registrar 155 (block 503). In the illustrated example, the registration data of the illustrated example includes an identifier of the panelist, demographic information, and/or a classification of the WiFi network that is being registered. The classification of the access point indicates a location of the mobile device (e.g., 'home', 'work', 'other', etc.).

In the illustrated example, the registration data is received by the registrar 155 (block 505) via an electronic interface (e.g., a website). However, the registrar may receive the registration data in any other way. For example, the registrar may receive the registration data via a telephone interface, direct mailings, predefined lists, etc.

Next, the registrar 155 assigns a unique port to the panelist and/or the access point being registered (block 510). In the illustrated example, the unique port is within the Dynamic and/or Private Port range as defined by IRNA (e.g., port 49152 through 65535). However, any other port number in any other range may alternatively be used. In the illustrated example, because ports are assigned on a one port per client device and/or one port per client device per location basis, the port number functions as a unique identifier for the client device and/or for the client device and the location of the client device and/or the panelist.

The registrar 155 then generates an instruction document (block 515). The instruction document of the illustrated example includes the unique port assigned to the client device of the panelist on a per access point basis, and an Internet proxy address. The Internet proxy address is the address of the proxy 165. The port number is a port of the proxy 165 and is uniquely associated with the panelist and/or client device and with a location and/or access point of the panelist and/or client device. In the illustrated example, the instruction document is a URL identifying a proxy automatic configuration (PAC) file comprising configuration data including the port number and the Internet proxy address. However, any other type of document may be generated such as, for example, a comma separated (CSV) document, a portable document format (PDF) document, a Microsoft® Word® document, etc. In some examples, the instruction document is signed using a public/private key infrastructure. However, the instruction document may alternatively not be signed. If the instruction document is not signed, it may appear as an invalid instruction document to the panelist, which may cause the panelist to abandon participation in the panel.

Next, the registrar 155 transmits the instruction document to the client device (block 520). In the illustrated example, the instruction document is transmitted via an electronic mail (email) message. The email message includes the URL identifying the proxy automatic configuration (PAC) file. However, any other method(s) of transmitting the instruction document may additionally or alternatively be used. For example, the instruction document may be transmitted as an attachment to the email message, the registrar 155 may transmit a short message service (SMS) message comprising an Internet address where the client device may download the instruction document, a direct mailing may be sent to the panelist comprising the instruction document and/or additionally comprising an electronic medium containing the instruction document, a telephone call may be placed to orally instruct the panelist on how to configure the client device, etc. The panelist and/or client device then receives the instruction document (block 523). Additionally or alternatively, the instruction document may be interpreted by the client device or any other device (e.g., a personal computer of the panelist, etc.) such that the details specified in the instruction document may be programmatically applied to the client device.

The client device 110, 130 is then configured via the instruction document (block 525). Since, in the illustrated example, the instruction document includes and/or references a configuration file that may be interpreted by the client device 110, 130, the client device receives the transmitted instruction document and automatically applies the settings contained in the configuration file such that further Internet requests originating with the client are addressed to the corresponding port of the proxy 165. However, the instruction document may additionally or alternatively include human readable instructions that may guide the panelist on how to configure the client device. The instruction document may thereby instruct the panelist on how to apply the configuration file or may instruct the panelist on how to manually apply the data in the configuration file.

Upon application of the data contained in the instruction document, subsequent requests for Internet content made by the client device 110, 130 are routed according to the configuration file and/or instruction document. In particular, since the configuration file and/or instruction document includes the Internet proxy address and the unique port number assigned to the client device for a given access point (and/or generally), requests are proxied through the Internet proxy address via the unique port number.

FIG. 6 is a flowchart representative of example machine-readable instructions 600 that may be executed to implement an example client device of FIG. 1. The example machine-readable instructions 600 of FIG. 6 represent an implementation wherein an application applies proxy configuration settings to WiFi access point settings. In the examples illustrated below, the application is executed by a processor of the mobile device 205 (e.g., the application accessing internet content 220). However, the application might be executed by any other device such as, for example, a personal computer (PC) of the panelist.

In the illustrated example, the application is executed by a processor of the mobile device 205. The application examines a log created and stored on the mobile device 205. The log of the mobile device 205 is generated by the networking subsystem 210 and includes representations of SSIDs with which the mobile device 205 was and/or is in communication. The log further includes information related to WiFi networks that the mobile device was connected to. However, the log might additionally or alternatively include information related to WiFi networks that have been in range of the mobile device 205.

Advantageously, the application executed by the mobile device 205 might have access to determine WiFi networks to which the mobile device is and/or has been connected. Such access, for example, might be via inspection of the log file created by the networking subsystem of the mobile device. Additionally or alternatively, the access to determine WiFi networks to which the mobile device is and/or has been connected might be implemented by direct communication with the network subsystem 210. Based on the information contained in the log, the application of the illustrated example configures proxy information for frequently used WiFi networks. By interacting with the networking subsystem, the application of the illustrated example configures proxy settings for WiFi networks. Additionally or alternatively, if restricted by security policies, the application might save a record of WiFi networks that require configuration such that once synchronized, the WiFi networks may be configured.

Figure 7:
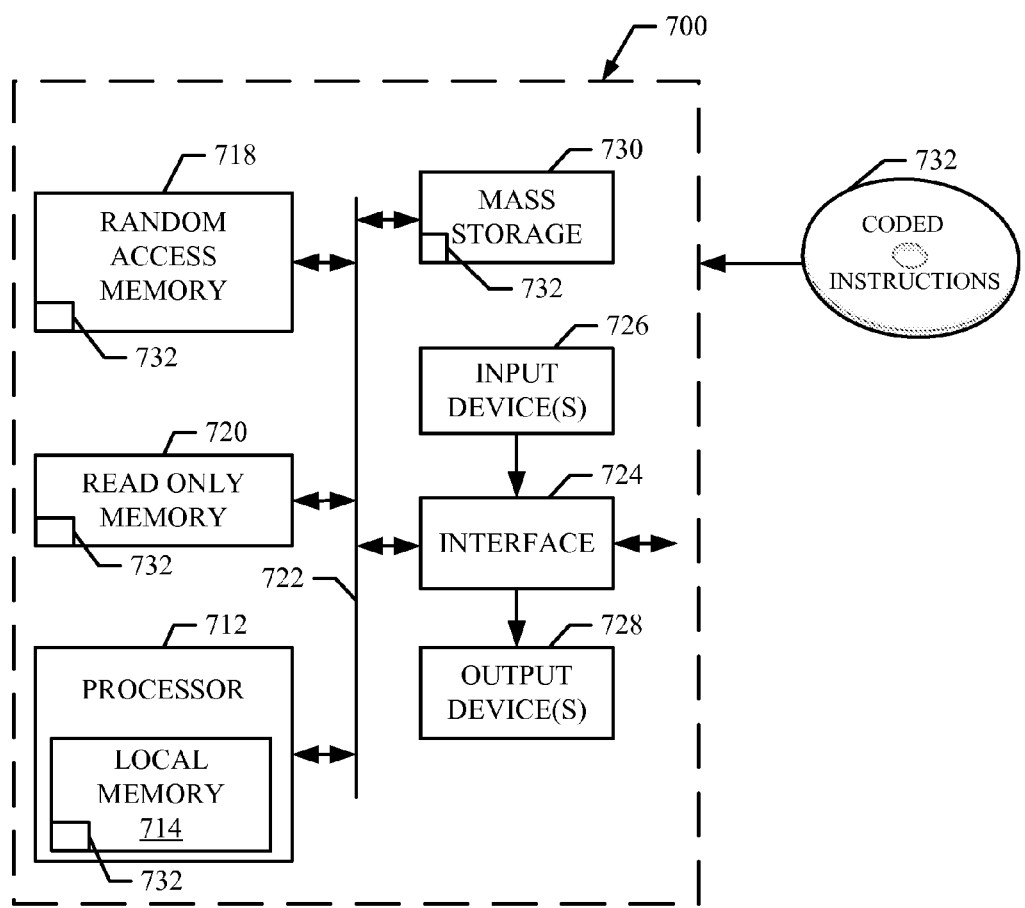
FIG. 7 is a block diagram of an example processor platform that may execute, for example, the machine-readable instructions of FIGS. 4, 5, and/or 6 to implement the example monitor of FIGS. 1, 2, and/or 3, the example registrar of FIG. 1, and/or the example client device of FIG. 1.

Additionally or alternatively, the application might be executed by a computer separate from the mobile device 205, such as the computer 700 shown in FIG. 7. When the mobile device 205 is docked and/or synchronized with the computer, the application examines a log created and stored on the mobile device 205. In such an example, the rapidity at which the application can detect frequently used WiFi networks is dependent on the frequency at which the panelist docks and/or synchronizes their mobile device 205. For example, some panelists may dock and/or synchronize their mobile device daily while other panelists might rarely dock and/or synchronize their mobile device (e.g., weekly, monthly, etc.)

Once the application executed by the computer identifies WiFi networks that are frequently used, the application of the illustrated example advantageously configures proxy settings of WiFi networks identified by their SSID. Configuration of the proxy settings might be required to occur via a device external to the mobile device 205 due to a security model implemented by the mobile device (e.g., access to programmatically modify proxy settings might only be available while docked and/or synchronizing).

The example machine-readable instructions 600 of FIG. 6 begin execution at block 605 when the WiFi configuration application is installed on the mobile device 205 (block 605). In the illustrated example the application is installed when the panelist navigates to an installation link (e.g., via a web page) on the mobile device. However, the application might be installed on the personal computer. Additionally or alternatively, the application might be installed via an application repository such as, for example, the Apple iTunes store, the Android Marketplace, etc.

Once the application is installed, the application receives configuration information from the panelist (block 610). In the illustrated example, the received configuration information is a panelist identifier that allows for association of the mobile device with the panelist. In some examples, the received configuration information is panelist registration information and allows for the recruitment of new panelists.

Next, the application of the illustrated example determines if the mobile device 205 has been attached to a WiFi network identified by an SSID (block 615). The application of the illustrated example determines if the mobile device 205 has been attached to a WiFi network identified by an SSID by inspecting logs created by the networking subsystem 210 of the mobile device 205. The logs in the illustrated example include events that identify times when the mobile device was connected to a WiFi network identified by an SSID. Additionally or alternatively, the application might determine if the mobile device 205 is currently attached to a WiFi network by inspecting the device network subsystem 210 (block 615). If the mobile device 205 is not currently attached to a WiFi network, the application waits for a period of time and then re-checks if the mobile device is currently attached to a WiFi network.

If the mobile device 205 is currently attached to a WiFi network, the application proceeds to determine if proxy settings are configured for the WiFi network (block 620). In the illustrated example, the application determines if proxy settings are configured by inspecting the device networking subsystem for proxy settings associated with the SSID associated with the WiFi network. In the illustrated example, if proxy settings are found, the proxy is assumed to already be monitored, and control proceeds to block 615 where the application waits and then determines if the mobile device is attached to a WiFi network. Ignoring SSIDs where the proxy settings are already set allows the panelist to configure settings for a WiFi network that is not to be monitored. For example, a WiFi network associated with the panelist's workplace might require that certain proxy settings be used to gain internet access and the panelist may not want work accesses to be monitored. Additional or alternative methods of determining whether the SSID associated with the WiFi network is configured for monitoring may be used such as, for example, the proxy address may be tested to determine whether it is part of the example monitoring system 100, a filter may be applied to the auto-configure URL to determine if it specifies a valid proxy auto-configuration (PAC) document.

Next, the application determines whether the SSID of the WiFi network is associated with a WiFi network that is frequently used (block 625). If the SSID is not frequently used, the interest in having the WiFi proxy settings may be low, and therefore control proceeds to block 625. If the SSID is frequently used, the WiFi network is of interest and the proxy configuration settings for that SSID are configured. In the illustrated example, the SSID is considered to be frequently used when the mobile device 205 is attached to the WiFi network associated with the SSID for more than a certain period of time (e.g., ten minutes, thirty minutes, etc.). However, any other method of determining whether an SSID is frequently used may additionally or alternatively be used. For example, an SSID might be considered frequently used when it reaches a data transmission threshold (e.g., five megabytes, twenty megabytes, etc.), an SSID might be considered frequently used when the WiFi network associated with the SSID is connected to more than a determined number of times (e.g., three times, five times, etc.). Additionally or alternatively, time based filtering may be used to determine if the SSID is frequently used in combination with any other method of determining if an SSID is frequently used. For example, an SSID might be frequently used if it is connected to more than three times in the past seven days, an SSID might be frequently used if it is connected to for more than a total of thirty minutes over the past month, etc.

If the WiFi network is a frequently used WiFi network (block 625), the application prompts the panelist to classify the network (block 630). In the illustrated example, the panelist is asked to classify the WiFi network as a home network, a work network, or an 'other' network. Additionally or alternatively, the panelist might be further prompted to use other descriptors to classify networks. For example, the panelist might be prompted to classify a WiFi network identified as 'other' as a WiFi network associated with a coffee shop, an airport, a library, etc. In the illustrated example, the panelist is given a limited number of options to choose from to make such a classification. However the panelist might additionally or alternatively be allowed to enter classifying information via a text field rather than asking the panelist to choose from a pre-determined list.

After the panelist identifies the classification of the WiFi network, the application determines if proxy settings are known for the selected classification (block 635). If the proxy settings are known, there may be no need to request proxy settings from the registrar 155. For example, the panelist might frequently use one or more 'home' networks. These 'home' network(s) may share proxy settings. Alternatively, the proxy settings might not be shared and the multiple 'home' networks might be proxied individually. The proxy settings of the illustrated example are stored in a memory such as the example random access memory 718 described in connection with FIG. 7. If the proxy settings are known (block 635), control proceeds to block 645 where the application applies the proxy settings to the WiFi network (block 645).

If the proxy settings are not known (block 635), control proceeds to block 640 where the application registers the WiFi network with the registrar 155 by transmitting an identification of the WiFi network and the classification of the WiFi network to the registrar 155 (block 640). The application then receives an instruction document specifying proxy settings to be used in association with the WiFi network (block 643). After receiving the proxy settings, the application applies the proxy settings to the WiFi network (block 645) and control then proceeds to block 645.

FIG. 7 is a block diagram of an example processor platform 700 capable of executing the instructions of FIGS. 4, 5, and/or 6 to implement the monitoring system of FIG. 1. The processor platform 700 can be, for example, a server, a personal computer, or any other type of computing device.

The processor platform 700 of the instant example includes a processor 712. For example, the processor 712 can be implemented by one or more Intel® microprocessors from the Pentium® family, the Itanium® family or the XScale® family. Other processors from other families are also appropriate.

The processor 712 is in communication with a main memory including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 714 is typically controlled by a memory controller (not shown).

The processor platform 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device (e.g., the request servicer 310) such as a modem or network interface card to facilitate exchange of data with external computers via a network (e.g., an Ethernet connection, a digital subscriber line (DSL), a telephone line, coaxial cable, a cellular telephone system, etc.).

The processor platform 700 also includes one or more mass storage devices 730 for storing software and data. Examples of such mass storage devices 730 include floppy disk drives, hard drive disks, compact disk drives, and digital versatile disk (DVD) drives. The mass storage device 730 may implement the storage database 160.

The coded instructions 732 of FIGS. 4, 5, and/or 6 may be stored in the mass storage device 730, in the volatile memory 718, in the non-volatile memory 720, in the local memory 714, and/or on a removable storage medium such as a CD or DVD.

From the foregoing, it will be appreciated that example methods, apparatus and articles of manufacture have been disclosed which allow Internet content requests made from mobile devices to be associated with specific individuals without requiring authorization credentials while still uniquely identifying the requesting device and/or panelist and/or a location (e.g., a local access point) of the requesting device and/or panelist irrespective of whether the request originated with a browser or an application accessing Internet content.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

What is claimed is:

1. A method of monitoring usage of a mobile device, the method comprising:
   determining, with a processor, whether a device is communicatively coupled to a WiFi network, the WiFi network identified by a Service Set Identifier;
   identifying whether proxy settings are configured on the device in association with the WiFi network;
   determining whether the device has reached a threshold usage level in association with the WiFi network;
   in response to determining (1) that the device has reached the threshold usage level and (2) that the proxy settings are not configured, transmitting registration information from the device to a registrar, the registration information including a classification of the WiFi network and the Service Set Identifier; and
   configuring the proxy settings of the WiFi network based on instructions received from the registrar, the instructions to cause the device to transmit network communications using the proxy settings when communicatively coupled to the WiFi network.

2. The method as defined in claim 1, wherein the proxy settings include a proxy server address and a proxy server port.

3. The method as defined in claim 2, wherein the proxy server address and the proxy server port are uniquely assigned to the device and Service Set Identifier combination.

4. The method as defined in claim 1, wherein the threshold usage level is a duration of connectivity to the WiFi network.

5. The method as defined in claim 1, wherein the threshold usage level is a data transmission threshold.

6. The method as defined in claim 1, wherein the threshold usage level is a number of connection occurrences.

7. The method as defined in claim 6, wherein the number of connection occurrences is calculated over an interval of time.

8. The method as defined in claim 1, wherein the threshold usage level is a number of connection occurrences between a first time of day and a second time of day.

9. The method as defined in claim 1, further including prompting a panelist to classify the WiFi network.

10. The method as defined in claim 9, wherein the WiFi network is classified as a home network.

11. The method as defined in claim 1, wherein the registration information includes an identifier of the device.

12. A non-transitory machine-readable storage medium comprising first instructions which, when executed, cause a computing device to at least:
  determine whether the device is communicatively coupled to a WiFi network, the WiFi network identified by a Service Set Identifier;
  identify whether proxy settings are configured on the computing device in association with the WiFi network;
  determine whether the device has reached a threshold usage level in association with the WiFi network; and
  in response to a determination (1) that the computing device has reached the threshold usage level and (2) that the proxy settings are not configured, transmit registration information from the computing device to a registrar, the registration information including a classification of the WiFi network and the Service Set Identifier, the device to configure the proxy settings of the WiFi network on the computing device by executing configuration instructions received from the registrar, the configuration instructions to cause the computing device to transmit network communications using the proxy settings when communicatively coupled to the WiFi network.

13. The non-transitory machine-readable storage medium as defined in claim 12, wherein the proxy settings include a proxy server address and a proxy server port.

14. The non-transitory machine-readable storage medium as defined in claim 13, herein the proxy server address and the proxy server port are uniquely assigned to the computing device and Service Set Identifier combination.

15. The non-transitory machine-readable storage medium as defined in claim 12, wherein the threshold usage level is a duration of connectivity to the WiFi network.

16. The non-transitory machine-readable storage medium as defined in claim 12, wherein the threshold usage level is a data transmission threshold.

17. The non-transitory machine-readable storage medium as defined in claim 12, wherein the threshold usage level is a number of connection occurrences.

18. The non-transitory machine-readable storage medium as defined in claim 17, wherein the number of connection occurrences is calculated for a period of time.

19. The non-transitory machine-readable storage medium as defined in claim 12, wherein the threshold usage level is a number of connection occurrences between a first time and a second time.

20. The non-transitory machine-readable storage medium as defined in claim 12, wherein the first instructions, when executed, cause the computing device to prompt a panelist to classify the WiFi network.

21. The non-transitory machine-readable storage medium as defined in claim 20, wherein the WiFi network is classified as a home network.

22. The non-transitory machine-readable storage medium as defined in claim 12, wherein the registration information includes an identifier of the computing device.

* * * * *

UNITED STATES PATENT AND TRADEMARK OFFICE
CERTIFICATE OF CORRECTION

| | | |
|---|---|---|
| PATENT NO. | : 9,307,418 B2 | Page 1 of 1 |
| APPLICATION NO. | : 14/041613 | |
| DATED | : April 5, 2016 | |
| INVENTOR(S) | : Achilleas Papakostas et al. | |

It is certified that error appears in the above-identified patent and that said Letters Patent is hereby corrected as shown below:

ON THE TITLE PAGE

In Item 73 Assignee: delete "Nielson" and insert --Nielsen-- between "THE" and "COMPANY"

Signed and Sealed this
Thirty-first Day of May, 2016

Michelle K. Lee
*Director of the United States Patent and Trademark Office*